United States Patent
Hassan Hussein et al.

(10) Patent No.: US 12,363,729 B2
(45) Date of Patent: *Jul. 15, 2025

(54) JOINT RESOURCE POOLS FOR UPLINK COMMUNICATIONS

(71) Applicant: KONINKLIJKE PHILIPS N.V., Eindhoven (NL)

(72) Inventors: Khaled Shawky Hassan Hussein, Erlangen (DE); Thomas Wirth, Kleinmachnow (DE); Thomas Fehrenbach, Berlin (DE); Thomas Haustein, Potsdam (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,108

(22) Filed: Jul. 26, 2022

(65) Prior Publication Data

US 2022/0369361 A1 Nov. 17, 2022

Related U.S. Application Data

(63) Continuation of application No. 16/712,858, filed on Dec. 12, 2019, now Pat. No. 11,405,948, which is a (Continued)

(30) Foreign Application Priority Data

Jun. 14, 2017 (EP) ..................... 17176136

(51) Int. Cl.
*H04W 72/04* (2023.01)
*H04L 1/08* (2006.01)
(Continued)

(52) U.S. Cl.
CPC ............... *H04W 72/23* (2023.01); *H04L 1/08* (2013.01); *H04W 72/542* (2023.01); *H04W 74/0841* (2013.01)

(58) Field of Classification Search
CPC ...... H04L 1/08; H04W 72/23; H04W 72/542; H04W 74/006; H04W 74/02; H04W 74/0841; H04W 74/085
See application file for complete search history.

(56) References Cited

U.S. PATENT DOCUMENTS 5,162,791 A 11/1992 Heegard
9,252,930 B2 2/2016 Qu et al.
(Continued)

FOREIGN PATENT DOCUMENTS

CN 1951042 A 4/2007
EP 1833182 A1 9/2007
(Continued)

OTHER PUBLICATIONS

"3GPP TS 36.211, Evolved Universal Terrestrial (EUTRA); "Physical Channels and Modulation"", Rel 14, V14.0.0, (Sep. 2016).
(Continued)

*Primary Examiner* — Phuc H Tran

(57) ABSTRACT

Examples refer to communication networks between user equipments, UEs, with other devices, such as a base station, BS. Examples refer to communication methods, e.g., for uplink, UL. A joint-resource pool (JRP) is defined.

24 Claims, 11 Drawing Sheets

Related U.S. Application Data continuation of application No. PCT/EP2018/065732, filed on Jun. 13, 2018.

(51) Int. Cl.
*H04W 72/23* (2023.01)
*H04W 72/542* (2023.01)
*H04W 74/0833* (2024.01)

(56) References Cited

U.S. PATENT DOCUMENTS

| | | | |
|---|---|---|---|
| 10,568,129 B2* | 2/2020 | Jeon | H04W 72/0446 |
| 2004/0228320 A1 | 11/2004 | Laroia et al. | |
| 2005/0249118 A1 | 11/2005 | Terry et al. | |
| 2009/0150739 A1 | 6/2009 | Park et al. | |
| 2009/0279480 A1 | 11/2009 | Rosenqvist et al. | |
| 2010/0115366 A1 | 5/2010 | Wang | |
| 2010/0278121 A1 | 11/2010 | Chun et al. | |
| 2011/0051657 A1 | 3/2011 | Li et al. | |
| 2011/0078527 A1 | 3/2011 | Seshadri et al. | |
| 2011/0286498 A1 | 11/2011 | Abrishamkar et al. | |
| 2012/0057560 A1 | 3/2012 | Park et al. | |
| 2012/0213196 A1 | 8/2012 | Chung et al. | |
| 2013/0286835 A1 | 10/2013 | Plamondon et al. | |
| 2013/0294367 A1 | 11/2013 | Jalloul et al. | |
| 2013/0343273 A1 | 12/2013 | Barbieri et al. | |
| 2014/0050105 A1 | 2/2014 | Wang et al. | |
| 2014/0092784 A1 | 4/2014 | Khayrallah et al. | |
| 2014/0192763 A1 | 7/2014 | Eriksson et al. | |
| 2014/0341165 A1 | 11/2014 | Wang et al. | |
| 2015/0049712 A1 | 2/2015 | Chen et al. | |
| 2015/0085836 A1 | 3/2015 | Kang et al. | |
| 2015/0189546 A1 | 7/2015 | Earnshaw et al. | |
| 2015/0222394 A1 | 8/2015 | Cheng et al. | |
| 2015/0263829 A1 | 9/2015 | Nguyen et al. | |
| 2015/0327275 A1* | 11/2015 | Kwon | H04L 5/001 370/236 |
| 2016/0050667 A1* | 2/2016 | Papasakellariou | H04W 52/0251 370/329 |
| 2016/0057773 A1 | 2/2016 | Quan et al. | |
| 2016/0112162 A1 | 4/2016 | Tabet et al. | |
| 2016/0119105 A1 | 4/2016 | Jiang et al. | |
| 2016/0128090 A1 | 5/2016 | Azarian Yazdi et al. | |
| 2016/0270053 A1 | 9/2016 | Zeng et al. | |
| 2016/0286545 A1* | 9/2016 | Luo | H04L 1/1812 |
| 2017/0019894 A1* | 1/2017 | Nimbalker | H04L 5/0053 |
| 2017/0034845 A1 | 2/2017 | Liu et al. | |
| 2017/0207884 A1 | 7/2017 | Jiang et al. | |
| 2017/0238272 A1* | 8/2017 | You | H04L 5/001 370/350 |
| 2018/0115382 A1 | 4/2018 | Manolakos et al. | |
| 2018/0249374 A1* | 8/2018 | Park | H04L 5/00 |
| 2018/0332501 A1 | 11/2018 | Tseng et al. | |
| 2018/0332566 A1 | 11/2018 | You et al. | |
| 2020/0059962 A1* | 2/2020 | Tejedor | H04W 76/14 |
| 2020/0244405 A1 | 7/2020 | Li et al. | |
| 2023/0138578 A1* | 5/2023 | Azizi | H04W 4/08 370/329 |

FOREIGN PATENT DOCUMENTS

| | | |
|---|---|---|
| EP | 2214340 A1 | 8/2010 |
| EP | 2443895 A1 | 4/2012 |
| EP | 2521405 A1 | 11/2012 |
| EP | 2768171 A1 | 8/2014 |
| JP | 2009159440 A | 7/2009 |
| JP | 2011091677 A | 5/2011 |
| JP | 2015527791 A | 9/2015 |
| KR | 20140130145 A | 11/2014 |
| KR | 20160045750 A | 4/2016 |
| KR | 20160122666 A | 10/2016 |
| KR | 20170054218 A | 5/2017 |
| WO | 2010145799 A1 | 12/2010 |
| WO | 2016069159 A1 | 5/2016 |
| WO | 2016175631 A1 | 11/2016 |
| WO | 2016191985 A1 | 12/2016 |

OTHER PUBLICATIONS

"3GPP TS 36.211, Evolved Universal Terrestrial Radio Access (EUTRA); "Physical Channels and Modulation"", Release 13, V13.1.0.

"3GPP TS 36.212, Evolved Universal Terrestrial Radio Access (EUTRA); "Multiplexing and channel coding"", Release 13, V13.1.0.

"3GPP TS 36.213, Evolved Universal Terrestrial Radio Access (EUTRA); "Physical layer procedures"", Release 13, V13.1.1, (Mar. 2016).

"R1-1700024. 3GPP TSG RAN WG1 NR Ad Hoc Meeting Support of URLLC in UL", Huawei, HiSilicon, Spokane, USA, Jan. 16-20, 2017.

"R1-1700375 3GPP TSG RAN WG1 NR Ad-Hoc Meeting, "Uplink URLLC Transmission without Grant"", Intel, Spokane, USA, Jan. 16-20, 2017.

"R1-1704481. 3GPP TSG RAN WG1 Meeting #88, Discussions on HARQ for grant-free UL URLLC", Fujitsu, Spokane, USA, Apr. 3-7, 2017.

"Radio Resource Control (RRC); Protocol specification", TR 36.331.

"RP-150465, 3GPP TSG RAN Meeting #67, New SI proposal: Study on Latency reduction techniques for LTE", 3GPP RAN Plenary No. 67, Shanghai, China, Mar. 9-12, 2015.

"SPS—http://howltestuffworks.blogspot.de/2013/10/semi-persistent-scheduling.html".

"Uplink URLLC Transmission without Grant", Intel Corporation, R1-1701206,3GPP TSG RAN WG1 #AH, 3GPP, date of disclosure: (Jan. 18, 2017), Jan. 18, 2017.

Beh, Kian Chung, et al., "Performance evaluation of hybrid ARQ schemes of 3GPP LTE OFDMA system", K. C. Beh, A. Doufexi, and S. Armour, in Proceeding of IEEE 18th International Symposium on Personal, Indoor and Mobile Radio Communications (PIMRC), Athens, Greece, Sep. 2007, pp. 1-5., pp. 1-5.

Gudipati, Aditya, et al., "Strider: automatic rate adaptation and collision handling.SIGCOMM Comput. Commun.", Rev. 41, 4 (Aug. 2011), 158-169, pp. 158-169.

Huawei et al., "Data transmission for DL URLLC", R1-1706917, 3GPP TSG RAN WG1 #89, 3GPP, date of disclosure: (May 6, 2017), May 6, 2017.

Huawei, et al., "Link adaptation for URLLC transmission", R1-1708127, 3GPP TSG RAN WG1 #89, 3GPP, date of disclosure: (May 6, 2017), May 6, 2017.

Huawei, et al., "UL Grant-free transmission", R1-1701665, 3GPP TSG RAN WG1 #88, 3GPP, date of disclosure: (Feb. 6, 2017), Feb. 6, 2017.

Hui, J. Y. N., "Multiple accessing for the collision channel without feedback", IEEE Transactions on Vehicular Technology, vol. 33, No. 3, pp. 191-198, Aug. 1984, pp. 191-198.

Intel Corporation, "On UL grant free transmissions [online]", 3GPP TSG RAN WG1 #89 R1-1707407, Internet: <URL: http://www.3gpp.org/ftp/tsg_ran/WG1_RL1/TSGR1_89/Docs/R1-1707407.zip>, May 7, 2017, May 7, 2017, 9 pp.

Kurt, Tolga, et al., "Space-frequency coding reduces the collision rate in FH-OFDMA", IEEE Transactions on Wireless Communications, vol. 4, No. 5, pp. 2045-2050, Sep. 2005. doi: 10.1109/TWC.2005.8538, pp. 2045-2050.

Massey, James L., et al., "The collision channel without feedback", IEEE Trans. Inf. Theor. 31, 2 (Sep. 2006), 192-204. DOI=http://dx.doi.org/10.1109/TIT.1985.1057010.

NTT Docoma, Inc, "UL data transmission without grant", [online], 3GPP TSG RAN WG1 #89 R1-1708479, Internet URL: http://www.3gpp.org/ftp/tsg_ran/WG1_RL1/TSGR1_89/Docs/R1-1708479.zip>, May 6, 2017, pp. 1-3.

Paolini, Enrico, et al., "Graph-Based Random Access for the Collision Channel without Feedback: Capacity Bound", Global Telecommunications Conference (Globecom 2011), 2011 IEEE, Houston, TX, USA, 2011, pp. 1-5, pp. 1-5.

(56) References Cited

OTHER PUBLICATIONS

Parandeh Gheibi, Ali, et al., "Collision Helps—Algebraic Collision Recovery for Wireless Erasure Networks", CoRR abs/1001.1948 (2010).
Schlegel, Christian, et al., "Coordinated Multiuser Communications", p. 92-99, p. 92-99.
Wang, H, et al., "Performance of TTI Bundling for VoIP In EUTRAN TDD Mode", Vehicular Technology Conference, 2009. VTC Spring 2009. IEEE 69th, Barcelona, pp. 1-5, pp. 1-5.
Weiner, M, et al., "Design of a low-latency, high-reliability wireless communication system for control applications", 2014 IEEE International Conference on Communications (ICC), Sydney, NSW, 2014, pp. 3829-3835, pp. 3829-3835.
Yan, Li, et al., "A Low-Latency Collaborative HARQ Scheme for Control/User-Plane Decoupled Railway Wireless Networks", IEEE Transactions on Intelligent Transportation Systems, vol. 17, No. 8, pp. 1-14, Aug. 2016, pp. 1-14.
Zhou, Yu, et al., "LTE Uplink Coverage Enhancement Techniques Based on Enhanced TTI Bundling", Wireless Communications, Networking and Mobile Computing (WiCOM), 2012 8th International Conference on, Shanghai, 2012, pp. 1-4, pp. 1-4.
ZTE, "HARQ for URLLC UL Grant-free transmission [online]", 3GPP TSG RAN WG1 #89, R1-1707166, May 6, 2017, 5/6/217, 8 pp.

\* cited by examiner frequency or other resources → case ~1: managed access resource pool for
grant-free transmission (UE₁ and UEₖ) with no collision case ~2: managed access resource pool almost filled with
grant-free transmission (UE₁ and UEₖ) with no collision case ~3: managed access resource pool over filled with
grant-free transmission (UE₁ and UEₖ) with partial collision

JOINT RESOURCE POOLS FOR UPLINK COMMUNICATIONS

CROSS-REFERENCE TO RELATED APPLICATIONS

This application is a continuation of copending U.S. application Ser. No. 16/712,858, filed Dec. 12, 2019, which is incorporated herein by reference in its entirety, which is a continuation of International Application No. PCT/EP2018/065732, filed Jun. 13, 2018, which is incorporated herein by reference in its entirety, and additionally claims priority from European Application No. 17176136.4, filed Jun. 14, 2017, which is also incorporated herein by reference in its entirety.

BACKGROUND OF THE INVENTION

Examples refer to communication networks between user equipments, UEs, with other devices, such as a base station, BS.

Examples refer to communication methods, e.g., for uplink, UL.

Communications networks may need transmissions and receptions between user equipment, UEs, and a central entity or device (e.g., base station, BS, such as eNB/gNB, a core network entity), in uplink, UL (from the UE to the BS), and/or downlink, DL (from the BS to the UE).

Interferences may be generated between transmissions and/or receptions of different UEs, with the same BS, for example.

It is here focused on the uplink (UL) communication from a user terminal (or user equipment (UE)) or multiple UEs, to a base station (BS) in a communication system (e.g., a wireless communication system). Multiple UEs may transmit voice or data packets to a BS simultaneously.

In mobile communication systems, the uplink (UL) is a limiting factor. User equipment (UEs) have limited capabilities, mainly due to fact that these devices are highly integrated, especially with reference to:
- limited transmit power,
- limited processing capabilities,
- battery restrictions,
- use of spatial degrees of freedom due to UE complexity with only support of a single transmit and receive antenna or a small number of transmit and receive antennas.

Furthermore, signals from a UE to a base station can suffer from a number of impairments:
- UEs can be shaded from the base station signal (e.g. in-building),
- UEs can be on the cell edge of a cell,
- UEs can handover to another cell,
- UEs can be in interference zones if receiving signals from a set of base stations transmitting on the same frequency,
- UEs can move at various speeds, and thus the radio channel might vary while communicating.

FIG. 11 shows a known system in which different UEs (UE'$_k$, UE'$_j$, UE'$_4$) communicate with a base station in uplink using a standard Uu interface. UE'$_k$ communicates with UE'$_j$ in a device-to-device (D2D) scenario using the PC5 link. UEs may experience interference from other UEs.

In several communications schemes, cyclic transmissions are scheduled by a BS among different UEs. When a UE transmits a UL data it is theoretically assumed that no other UE performs a transmission using simultaneously. However, disturbance actually arises in practice, e.g. by UEs in a neighboring cell transmitting on the same frequency band in the same time slot.

In some cases, there may be PC5-based interference if PC5 resources are not aligned well enough to resources provided by the base station for the Uu. This may cause, in some cases, interference.

The interference from neighboring cells may occur, for example, in LTE/NR networks. An example is shown in FIG. 11, in which transmissions of UE'$_j$ interferes with transmissions of UE'$_4$.

Techniques for coping with failures of communications have been developed in the known technology. However, it is difficult to cope with all possible failures, in particular for scheduled transmission: the retransmission of previously transmitted data or redundancy versions of the data would take the place of (or would cause data collision with) the data that are to be transmitted subsequently.

SUMMARY

An embodiment may have a user equipment, UE, configured to: receive, from an external device, configuration data of a joint-resource pool, JRP, for uplink, UL, communications in JRP physical resources shared with other UE(s); and transmit a data in the JRP and, in case of necessity of retransmission, use a particular granted resource for retransmitting the data, wherein the UE is further configured to access the JRP according to a listen-before-talk scheme.

According to another embodiment, a method may have the steps of: receiving, by a user equipment, UE, configuration data of a joint-resource pool, JRP, for uplink, UL, communications in JRP physical resources, wherein a JRP physical resource is shared with at least one of other UEs; and transmitting a data in the JRP and, in case of necessity of retransmission, using a particular granted resource for retransmitting the data, wherein accessing the JRP is according to a listen-before-talk scheme.

Another embodiment may have a non-transitory digital storage medium having stored thereon a computer program for performing a method having the steps of: receiving, by a user equipment, UE, configuration data of a joint-resource pool, JRP, for uplink, UL, communications in JRP physical resources, wherein a JRP physical resource is shared with at least one of other UEs; and transmitting a data in the JRP and, in case of necessity of retransmission, using a particular granted resource for retransmitting the data, wherein accessing the JRP is performed according to a listen-before-talk scheme, when said computer program is running in a computer.

In accordance with an aspect, a user equipment, UE, is configured to:
- receive, from an external device, configuration data of a joint-resource pool, JRP, for uplink, UL, communications in JRP physical resources shared with other UEs;
- perform UL communications by transmitting data on granted physical resources; and
- determine whether to perform additional UL communications and, in case of positive determination, perform additional UL communications by transmitting data on JRP physical resources.

Accordingly, it is possible to provide the UE with additional communication resources which may be used when needed (e.g., urgent calls, low QoS), to adapt the UEs to the conditions of the network.

In accordance with an aspect, the configuration data of the JRP comprise rules for medium access and/or collision resolution and/or data retransmissions and/or redundancy transmissions.

Hence, besides defining which are the JRP resources (e.g., which time slots, frequency bands, code dimensions, spatial channels, power levels, and so on), the configuration data of the JRP may also define, for each UE, how to behave (e.g., which medium access protocol to use) when accessing the JRP resources. Accordingly, the UE will operate according to the advantageous communication scheme, hence increasing the QoS for the entire network.

In accordance with an aspect, the UE may be configured to determine whether to perform additional UL communications according to criteria associated to at least one of traffic or metrics on traffic, quality of service, QoS or metrics on QoS, the determination of an incorrectly transmitted data or metrics on determinations of incorrectly transmitted data, urgency of communications, and/or a selection.

Accordingly, an UE which, e.g., suffers of low QoS, may make use of the JRP when it determines that communication resources, other than the granted resources, are needed, hence adapting the UE to the particular situation.

In accordance with an aspect, the UE may be configured to use a particular granted resource for retransmitting a data and use the JRP for transmitting a data scheduled for the particular granted resource. In accordance with an aspect, this may be a rule provided in the configuration data by the external device.

The retransmitted data (which may be, for example, a data which has been previously transmitted by the UE but which has not been properly received by a receiver) may therefore be retransmitted in a physical resource which had not been used for the previously transmitted data. Accordingly, diversity is increased: if the granted physical resource used for the previously transmitted data is (e.g., transitorily, unexpectedly) less reliable than the JRP granted resource, the probability of a correct retransmission is increased, hence increasing reliability. Accordingly, the UE may adaptively choose a more reliable channel for a previously incorrect transmission.

In accordance with an aspect, the UE may be configured to use a ranking of JRP resources so as to give priority to higher-ranked JRP resources. In accordance with an aspect, this may be a rule provided in the configuration data by the external device.

For example, the JRP physical resource assigned to a first UE may comprise a plurality of resources ranked from a first ranked to a least ranked. The first choice for the first UE may be the first ranked JRP physical resource. The last choice for a UE may be the last ranked JRP physical resource. Analogously, the JRP physical resource assigned to a second UE may comprise a plurality of resources ranked from a first ranked to a least ranked. The ranking for the first UE may be different from the ranking of the second UE. For example, the ranking for the second UE may be the opposite of the ranking of the first UE. Therefore, when both the first and second UEs use their assigned first ranked resource, their transmissions will not collide, as they will be transmitted using different physical resources. Accordingly, the occurrence of collisions is reduced, hence, increasing reliability.

In accordance with an aspect, the UE may comprise a transmission queue implemented at medium access control, MAC, layer and/or physical, PHY, layer. In accordance with an aspect, the UE may be configured to evacuate the transmission queue using the JRP and/or the granted resources according to the configuration data.

Accordingly, the granted and JRP resources to be used by the UE may be mapped in the hardware of the UE. The UE may be guided in the choice of the physical resources to be used. There may be a granted portion and a JRP portion. In each portion (which may be represented, for example, as a matrix), each row may be associated to a UL data (packet, message, transmission) to be transmitted. There may be an association of each UL data to the particular granted or JRP physical resource (e.g., time slot, frequency band, spatial channels, code dimensions, power level, and so on). Writing in the queue may imply the transmission of a UL data, for example, at an associated granted or JRP physical resource. Deleting a data from the queue may imply the avoidance of the transmission of that data (if the data has not been transmitted yet).

In accordance with an aspect, the UE may be configured to access the JRP according to a listen-before-talk scheme (e.g., CSMA). In accordance with an aspect, this may be a rule provided in the configuration data by the external device.

Accordingly, the reliability may be increased, as the occurrence of colliding transmissions may be avoided.

In accordance with an aspect, the UE may be configured to access the JRP according to a frequency-hopping scheme. In accordance with an aspect, this may be a rule provided in the configuration data by the external device.

Accordingly, the reliability may be increased, as the occurrence of colliding transmissions may be reduced, in view of increasing the probability of different UEs transmitting at different frequencies.

In accordance with an aspect, the JRP physical resources may be in at least one or some or any combination of the time domain, frequency domain, space domain, code domain, and power domain. In accordance with an aspect, the external device may indicate them in the configuration data.

Accordingly, the JRP physical resources may be the most appropriate for the transmissions, hence adapting the JRP physical resources to the conditions of the network.

In accordance with an aspect, a device may be configured to:
  determine, on the basis of metrics on traffic, metrics on quality of service, QoS, determination of reception of incorrect data, urgency of communications, and/or selections, physical resources forming a joint-resource pool, JRP, the physical resources being to be shared by different user equipments, UEs, for uplink, UL, communications;
  signal (e.g., by transmitting configuration data) the physical resources of the JRP to at least some of the UEs.

The device, which may be a central entity, such as a base station, BS (eNB/gNB, core network entity, etc.) or a UE chosen among a plurality of UEs, may therefore decide the physical resources for each UE. Accordingly, the device may control the communications in a network and determine the most appropriate configuration for the network.

In accordance with an aspect, the device may be configured to:
  define, for different UEs, different rankings of JRP physical resources, so as to prioritize different JRP physical resources for different UEs and/or increase the probability of using different JRP physical resources by different UEs.
  signal (e.g., by transmitting configuration data) the different resource rankings to the different UEs.

Hence, the device may instruct different UEs to use different rankings, hence reducing the possibility of collisions in the same JRP physical resource.

In accordance with an aspect, the device may be configured to:
- determine a reception of corrupted (non-properly decoded) data, so as to define different rankings of JRP physical resources for different UEs, so as to increase the probability of receiving a correct retransmission by giving different priorities to different JRP physical resources for different UEs and/or increasing the probability of using different physical resources by different UEs;
- signal (e.g., by transmitting configuration data) the different resource rankings to the different UEs.

Accordingly, when an incorrect reception of an UL data is determined by the device, it may react by modifying the rankings of each UE, hence reducing the probability of collisions.

In accordance with an aspect, the device may be configured to:
- determine rules for medium access and/or collision resolution and/or data retransmissions in the JRP;
- signal (e.g., by transmitting configuration data) the rules to at least some of the UEs.

Accordingly, not only the device decides which JRP physical resources are to be used, but it also defines how each UE behaves when entering the JRP resources.

In accordance with an aspect, the device may be configured to:
- determine different backoff timers for retransmissions in the JRP to be associated to different UEs;
- signal (e.g., by transmitting configuration data) the different backoff timers to the different UEs.

Accordingly, following this rule the UEs will retransmit in different time slots, therefore without collisions. Such a rule is particular advantageous in case of a first collision between UL data transmitted by two different UEs: in view of the definition of different backoff timers, a second collision is avoided. Hence, reliability is increased.

In accordance with an aspect, a method may comprise:
- receiving, by a user equipment, UE, configuration data of a joint-resource pool, JRP, for uplink, UL, communications in JRP physical resources shared with at least one of other UEs;
- performing UL communications by transmitting data on granted physical resources; and
- determining whether to perform additional UL communications and, in case of positive determination, performing additional UL communications by transmitting data on JRP physical resources.

Examples of this method may be performed, for example, by any of the UEs above and/or below.

In accordance with an aspect, a method may comprise:
- determining, on the basis of at least one of metrics on traffic, metrics on quality of service, QoS, determination of corrupted received data, urgency of communications, and/or selections, physical resources forming a joint-resource pool, JRP, the JRP physical resources being to be shared by different user equipments, UEs, for uplink, UL, communications;
- signal the physical resources to at least one or some of the UEs.

Examples of this method may be performed, for example, by any of the devices (e.g., central entities such as BSs, chosen UEs, and so on) above and/or below.

The methods above may be performed to form a method according to an aspect.

According to an aspect, a setup step may be provided in which the UEs define or elect the central entity. It is not strictly necessary that the BS is the central entity. The central entity may be, for example, one of the UEs.

According to an aspect, a non-transitory storage unit may store instructions, which, when executed by a processor, cause the processor to perform any of the methods above and below and/or to implement any of the products of above and below.

In examples, the user equipment may use a ranking of JRP resources so as to give priority to particular-ranked JRP resources providing gains for targeted goal.

BRIEF DESCRIPTION OF THE DRAWINGS

Embodiments of the present invention will be described in further detail with reference to the accompanying drawings, in which.

DETAILED DESCRIPTION OF THE INVENTION

Figure 1:
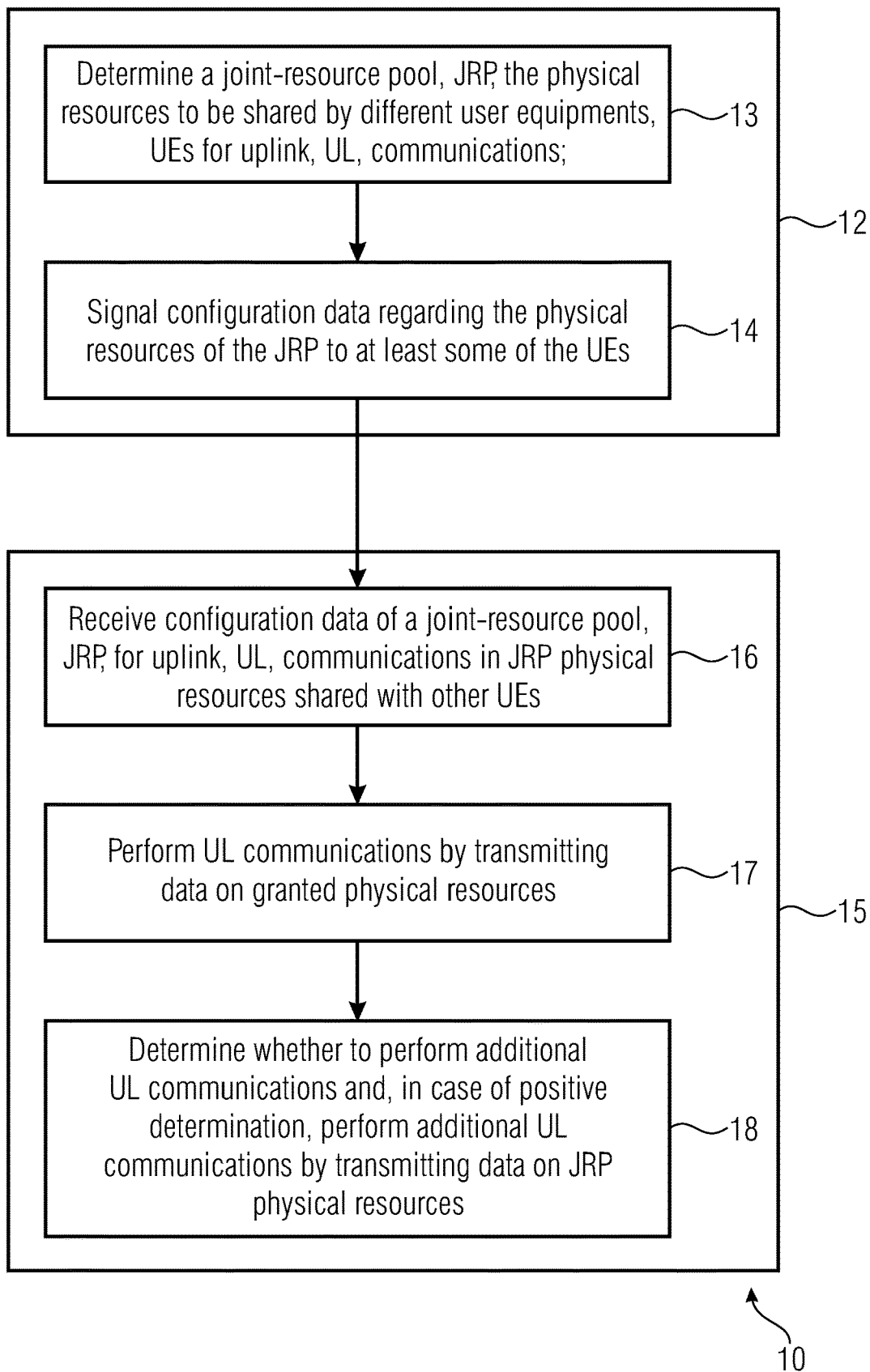
FIG. 1 shows a method(s) according to an example(s) of the invention.

FIG. 1 shows a method 10. The method 10 may permit communications of user equipments (UEs) in uplink (UL).

The method 10 may comprise, for example, a method 12. The method 12 may comprise, for example, a step 13 of determining physical resources forming a joint-resource pool, JRP, the physical resources to be shared by different user equipments, UEs for uplink, UL, communications. The method 12 may comprise, for example, a step 14 of signaling the physical resources (e.g., for UL in JRP) to at least some of the UEs (in some cases, also DL physical resources and/or granted UL physical resources may be signalled). The step 14 may comprise transmitting configuration data to the UEs (the configuration data may contain, inter alia, the indication of the JRP physical resources to be used by the UEs, and/or the rules for medium access, and/or the rules for collision resolution, and/or data retransmissions, and in some examples other data). Different physical resources of the JRP may be indicated to different UEs. The method 12 may be performed, for example, by a central entity. The central entity may comprise a device (such as a base station, BS, which may be a gNB/eNB or a core network entity, for example, or a UE elected or selected as central entity by the group of UEs) which determines resources to be used by the UEs. The method 12 may be performed by the same entity that allocates granted physical resources to the UEs (e.g., a scheduler device), for UL and/or DL.

In some examples, configuration data may be signalled (at 14), using Physical Downlink Control Channel, PDCCH, or enhanced PDCCH (ePDCCH) or sPDCCH (used in short transmission time interval, sTTI, mode, and/or for ultra-reliable low latency communication, URLLC, traffic) or sidelink, using terminology of Evolved Packet Core (EPC), LTE, 4G, and 5G. The signaling step may be performed via unicast, multicast, and/or broadcast.

The method 10 may comprise, for example, a method 15. The method 15 may comprise a step 16 of receiving (e.g., from the device that has performed the method 12 and/or the step 14), configuration data of the joint-resource pool, JRP, for uplink, UL, communications in JRP physical resources shared with other UEs (the configuration data indicating, for example, which JRP physical resources to be used by which UE, and/or which rules for medium access and/or collision resolution and/or data retransmissions and/or redundancy retransmissions, etc.). An instance of the method 15 may be performed by each of the UEs (different UEs may perform different instances, as consequence, for example, of different configuration data and/or different conditions). The method 15 may comprise, for example, a step 17 of performing UL communications by transmitting data on granted physical resources (which may be, for example, physical resources which are not part of the JRP) and/or by receiving data in DL (e.g., from the central entity such as a BS). The method 10 may comprise, for example, a step 18 of determining whether to perform additional UL communications. In case of positive determination, the method may comprise performing additional UL communications by transmitting data on JRP physical resources. The method 15 may be performed by each of a group of different UEs. To each UE, different physical resources of the JRP may be indicated. Therefore, each UE may perform UL communications on granted physical resources at step 17 and, in case of determination of the possibility and/or necessity of performing additional UL communications, each UE may transmit UL data (e.g., packets) using physical resources of the JRP which may be different from the physical resources of the JRP used by (assigned to) other UEs. Some of the different UEs, however, may share some resources of the JRP.

The method 10 may provide a communication under a standard for mobile communications, such as 3rd Generation Partnership Project (3GPP), 4G, 5G, long term evolution (LTE), NR, EPC, and so on. The communication may be according to universal mobile telecommunications system (UMTS) terrestrial radio access network (UTRAN) or an evolved UTRAN (eUTRAN). The communications may comprise time division duplex (TDD) transmissions (UL and/or DL transmissions). The communications may comprise frequency division duplex (FDD) transmissions (UL and/or DL transmissions). The BS may be an evolved node (eNB), a gNB (using the terminology of 5G) or, in general, a gNB/eNB. In some examples, a UE will use a BS as interface to a core network, e.g. evolved packet core (EPC) to setup a radio bearer with a certain QoS requirement. In NR, a UE can setup a service flow via gNB which is attached to a core network, e.g. EPC, to enable a packet-by-packet service flow.

EPC is the Evolved Packet Core, which consists of certain standardized interfaces and entities and may be used to interface the Radio Access Network (RAN) with the Internet or other non-3GPP interfaces (e.g. WLAN, etc.). The EPC may terminate the connection in an LTE/NR network, e.g. sets up security, QoS bearer/flows etc.

In some examples, at least some steps of the communications at 14, 16, 17, and/or 18 may be performed, for example, according to LTE or NR standard and/or other radio access technologies, e.g. WiFi, Bluetooth, and so on, according to the example.

The communications may be wireless, e.g., in radio frequencies (RF), e.g., using electromagnetic waves. In some examples, the communications may use ultrasound waves.

In examples, wireless communications may be based on a single-tone or multicarrier system based on frequency-division multiplexing, such as the orthogonal frequency-division multiplexing (OFDM) system, the orthogonal frequency-division multiple access (OFDMA) system defined by the LTE standard, or any other IFFT-based signal with or without CP, e.g. DFT-S-OFDM or SC-FDMA. Other waveforms, like non-orthogonal waveforms for multiple access, e.g. filterbank multicarrier (FBMC), may be used. It is also possible to use CP-SCFDMA (Cyclic Prefixed Single Carrier FDMA), e.g., in localized or continuous mode.

Figure 2A:
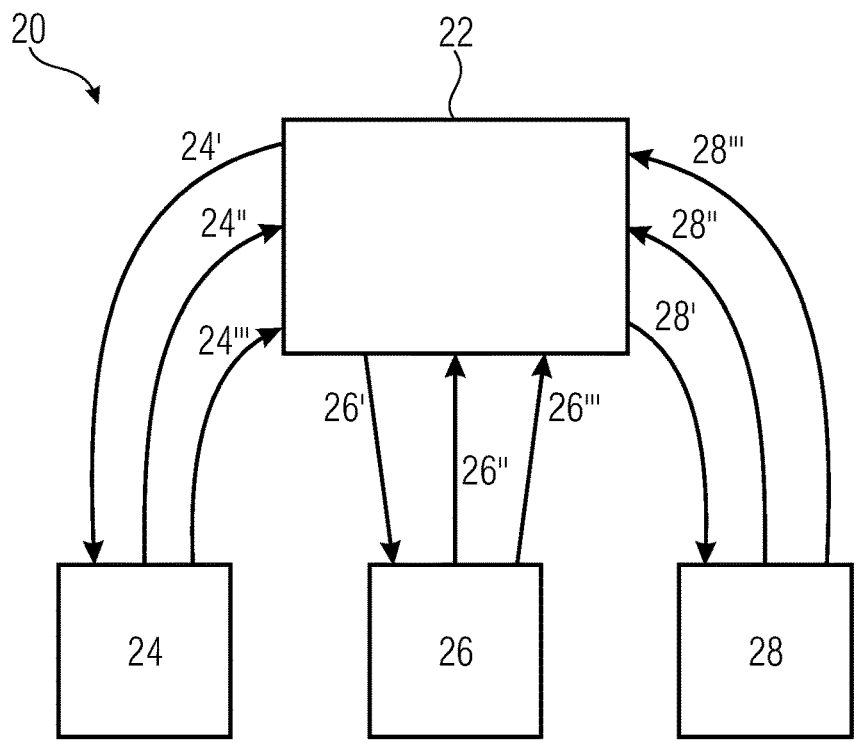
FIGS. 2a, 2b, 2c show systems according to examples of the invention.

FIG. 2a shows a system 20. The system 20 may implement, for example, a cellular network or a portion thereof. The system 20 may comprise a central entity 22. The system 20 may comprise a plurality of UEs 24, 26, 28. The central entity 22 may perform, for example, at least some of the steps of the method 12. The central entity may be, for example a BS (e.g., gNB/eNB, core network entity). The central entity 22 may define JRP physical resources for each UE. In addition, the central entity 22 may define the granted physical resources for each UE (e.g., by scheduling), e.g., for UL and/or DL communications. The central entity 22 may perform signal activities by sending signals 24', 26', 28' to UEs 24, 26, 28, respectively. The signals may carry JRP configuration data. In some examples, JRP configuration data directed to different UEs may carry different information: a particular UE does not necessarily need to know the configuration data signalled to other UEs. In some examples, the configuration data in the signals 24', 26', 28' are signalled through one of physical downlink control channel PDCCH, ePDCCH and sPDCCH or sidelink (e.g., using the PC5 interface). The UEs 24, 26, 28 may perform, at step 17, UL communications 24", 26", 28", respectively, in granted physical resources. When one of the UEs 24, 26, 28 needs to transmit a data out of the granted physical resources at its disposal, it may perform UL communications 24''', 26''', 28''' using the JRP physical resources.

In some examples, the central device is a device (which may also be a UE) which transmits configuration data (e.g., at step 14) to other UEs. Therefore, a distributed solution may be performed. It is possible that multiple UEs elect or define a central device among them which may define configuration data for the other UEs. Deterministic criteria (e.g., serial number of the UE), random, semi-random or pseudo-random criteria, or other criteria may be used to elect or define the central entity. Therefore, the central entity may be, some cases, be different from a BS. The configuration data may be transmitted at 14 using D2D, for example.

Figure 2B:
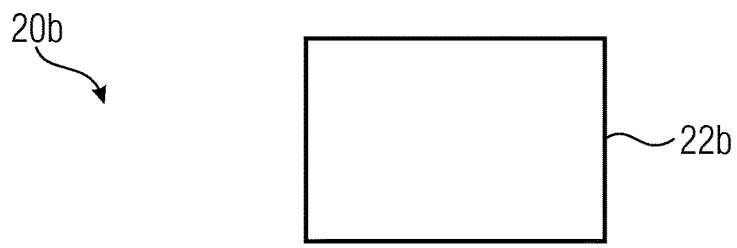
Figure 2B:
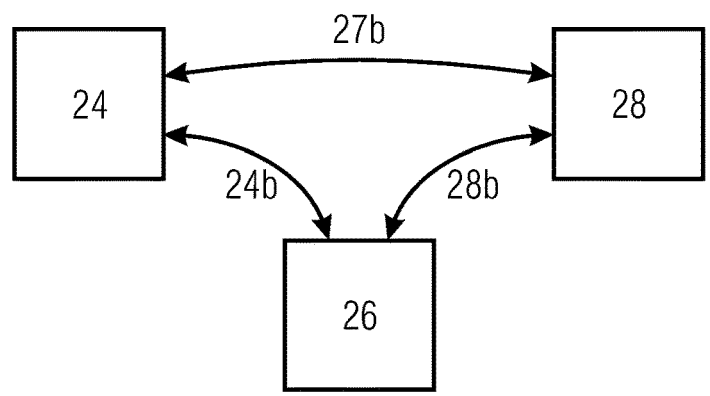
Figure 2C:
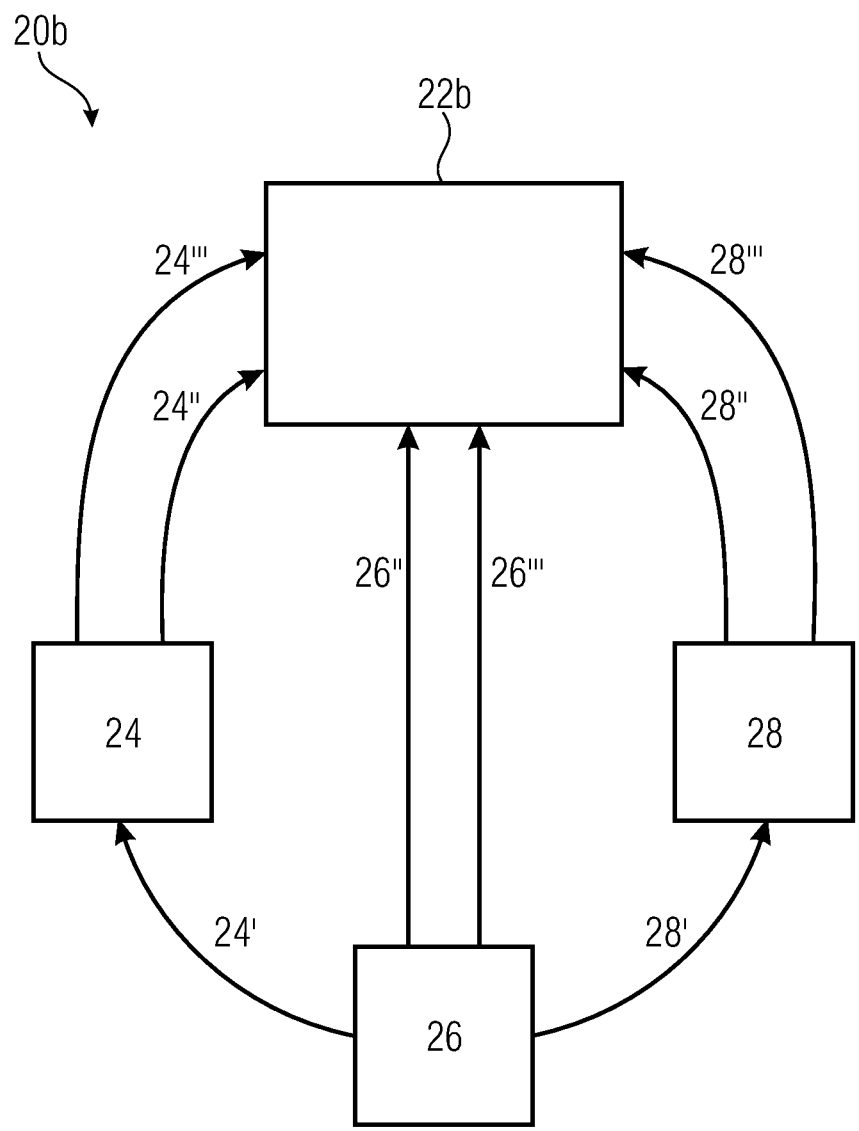

FIGS. 2b and 2c refer to a system 20b. The system 20b may comprise a BS 22b which is not the central entity that performs steps 13 and 14 (in some cases, however, the BS 22b may still be a scheduler for granted resources and/or for scheduling the DL resources). In this case, the central entity is one of the UEs 24, 26, 28 and may be elected or defined by the UEs. FIG. 2b in particular shows a setup step in which the UEs 24, 26, 28 define or elect the central entity by transmitting communications 24b, 27b, 28b with each other (e.g., using D2D, PC5, Bluetooth, WiFi, and so on). In this case, the central entity is chosen to be the UE 26 (the choice may be carried out by election, selection, or other strategies). As shown in FIG. 2c, the UE 26 (operating as central entity) may define the features of the JRP and/or rules for coping with medium access and/or collision resolution at step 13 and transmit signals 24' and 28' (carrying configuration data) to the UEs 24 and 28 at step 14. The UEs 24 and 28 receive the signals 24' and 28' at step 16. The UEs (in some examples, also the UE/central entity 26) may perform UL communications 24", 26", 28" towards the BS 22b using granted physical resources at step 17. The UEs (in some examples, also the UE/central entity 26) may perform UL communications 24''', 26''', 28''' towards the BS 22b using JRP physical resources at step 18.

In examples (such as in those shown in FIGS. 2a, 2b, 2c), at least one or more of the UEs may be, for example, devices which are chosen among mobile phones, smartphones, mobile/portable terminals, mobile/portable computers, tablets, relays, vehicular communication devices in cars, trucks, busses, mobile communication devices on drones or other aerial vehicles, and so on. At least some of the UEs may be IoT devices or communication devices connected to IoT devices. In some cases, in the example of FIG. 2b the central entity 26 may be a normal UE elected or defined among the other UEs.

Physical resources (granted physical resources and/or JRP physical resources) may be, for example in at least one or a combination of the time domain, in the frequency domain, in the spatial domain, in the code domain, in the power domain. Multiplexing techniques in at least one of these domains may be performed.

With reference to the time domain, granted physical resources may comprise time slots assigned (e.g., by scheduling) to different UEs for performing UL transmissions. Each time slot may be a physical resource assigned to a particular UE. A time slot can be a transmission time interval (TTI) or shortened TTI (sTTI), a group of TTIs, or a mini-slot (NR terminology). When performing the step 17, a UE may perform UL communications during its pre-assigned (scheduled) time slot.

With reference to the time domain, JRP physical resources may comprise time slots which are not pre-assigned to one UE. When performing the step 18, a UE may access the JRP by transmitting data in UL during one of the JRP time slots.

With reference to the frequency domain, granted physical resources may comprise frequency bands assigned (e.g., by scheduling) to different UEs for performing UL transmissions. Each frequency band may be a physical resource assigned to a particular UE. When performing the step 17, a UE may perform UL communications using its pre-assigned (scheduled) frequency.

With reference to the frequency domain, JRP physical resources may comprise frequency bands which are not pre-assigned to one UE. When performing the step 18, a UE may access the JRP by transmitting data in UL using a JRP frequency band.

With reference to the spatial domain, granted physical resources may comprise spatial channels (e.g., obtained by beamforming) assigned (e.g., by scheduling) to different UEs for performing UL transmissions. Each spatial channel may be a physical resource assigned to a particular UE. When performing the step 17, a UE may perform UL communications using its spatial channel.

With reference to the spatial domain, JRP physical resources may comprise spatial channels which are not pre-assigned to one UE. When performing the step 18, a UE may access the JRP by transmitting data in UL using a JRP spatial channel.

With reference to the code domain, granted physical resources may comprise codes assigned (e.g., by scheduling) to different UEs for performing UL transmissions, e.g. utilizing non-orthogonal multiple access (MUST) schemes. The codes may be physical resources, which may be partitioned between different UEs. When performing the step 17, a UE may perform UL communications using its codes.

With reference to the code domain, JRP physical resources may comprise codes which are not pre-assigned to particular UEs. When performing the step 18, a UE may access the JRP by transmitting data in UL using JRP codes.

With reference to the power domain, granted physical resources may comprise power levels assigned (e.g., by scheduling) to different UEs for performing UL transmissions. Each power value (e.g., a range of power levels) may be a physical resource, which may be assigned to a particular UE. When performing the step 17, a UE may perform UL communications using its power level.

With reference to the power domain, JRP physical resources may comprise power levels (e.g., power level ranges) which are not pre-assigned to a particular UE. When performing the step 18, a UE may access the JRP by transmitting data in UL at its power level.

In some examples, each physical resource (granted physical resources and/or JRP physical resource) may comprise a combination of time domain, frequency domain, spatial domain, code domain, power domain. For example, it may be decided (scheduled), by the central entity, that a particular UE transmits, during a first time slot, at first frequency band, in a first spatial channel, with first codes, at a first power level, and, during a second time slot, at a second frequency band, a second spatial channel, with second codes, at a second power level, and so on. Therefore, each physical resource (granted physical resource or JRP physical resource) may be defined as any combination of time, frequency, spatial channels, codes and/or power levels.

In examples, the JRP physical resources may be in at least (propagation) delay domain. In examples, the JRP physical resources may be in at least Doppler domain. These solutions may be achieved be achieved by allocating resources in delay-Doppler domain as it is addressable by wave forms like e.g. OTFS.

In some examples, physical resources may comprise device-to-device (D2D) communications, e.g., according to PC5.

The JRP physical resources may be used, for example, when data to be transmitted exceed the granted physical resources.

In some examples, the UL transmissions performed using granted physical resources and/or JRP physical resources may be for at least one of LTE Physical Uplink Control Channel (PUCCH), ePUCCH, sPUCCH (e.g., using the denominations set out in LTE, 4G, NR, 5G).

The JRP configuration data may associate, for example, physical resources to a plurality of UEs for performing UL. The JRP configuration data may associate, for example, some physical resources to any of the UEs (e.g., the first UE which accesses a JRP resource). Additionally or alternatively, the JRP configuration data may associate different physical resources to different UEs or groups of UEs (e.g., limiting the possibility of accessing to the JRP resources to some particular UEs).

Additionally or alternatively, the JRP configuration data may define different rankings of JRP resources for different UEs. For example, a first UE may advantageously access the JRP using a first frequency band (first-ranked frequency band for the first UE) and, in case of need, a second frequency band (second-ranked frequency band for the first UE), while a second UE may advantageously access the JRP using the second frequency band (first-ranked frequency band for the second UE) and, in case of need, the first frequency band (second-ranked frequency band for the second UE). Accordingly, the probability of collision is reduced.

Different rankings may be defined, for example, after that incorrect UL data have been received by the central entity (e.g., a BS), so as to increase the probability of having different UL transmissions performed at different JRP physical resources, so as to reduce the probability of collisions and increase reliability.

In Examples, the central entity may be an orchestrator. The orchestrator can be any device or entity which is able to orchestrate medium access to radio resources by any means of communication between the orchestrator and the devices involved in the communication process using the UL resources oft he JRP. In that sense an orchestrator could be a data base somewhere in the network accessible via eg OTT communication links (OTT: over the Top).

JRP resources can be ordered/ranked according to some criteria/metric e.g. congestion, RSSI level etc. meaning that selecting a specific resource from the ordered JRP allowing to achieve a particular goal with a better result or with less energy, effort etc. e.g. message collision probability.

Ranking criteria may be, for example:
Carrier frequency, e.g. if we operate JRP in dual connectivity mode or carrier aggregation, with possibly a couple of different carrier frequencies to choose from
Interference level or interference power, pilot power, uplink transmit power, etc.
Usable numerology in a given bandwidth part (BWP), e.g. prefer 30 kHz over 15 kHz (SCS).

It is possible in some examples to implement (e.g., where requested by the central entity and/or BS) a frequency-hopping scheme. For example, each frequency band may be hopped by different UEs differently (e.g., in a random, semi-random, pseudo-random fashion or according to a sequence pre-defined or defined in the configuration data). The configuration data may in some examples prohibit at least some JRP physical resources to at least some UEs according to the decision of the central entity and/or BS.

The JRP configuration data may contain different rules for accessing the JRP physical resources and/or for collision resolution. For example, the configuration data may define that (at least for some UEs) some UL data are (re-) transmitted after a backoff timer (whose length may be random, semi-random, pseudo-random, pre-defined or defined in the configuration data) prior to a possible listening schema. When operating in listen-before talk (LBT) mode, the device (e.g., UE) may perform, for example, carrier sensing combined with a random backoff before accessing JRP physical resources. Configuration data may provide that some UL data are retransmitted only using an automatic repeat request (ARQ) scheme or hybrid automatic repeat request (HARQ) scheme. Configuration data may provide that some UL data are retransmitted using a semi-persistent scheduling (SPS) scheme.

Figure 3:
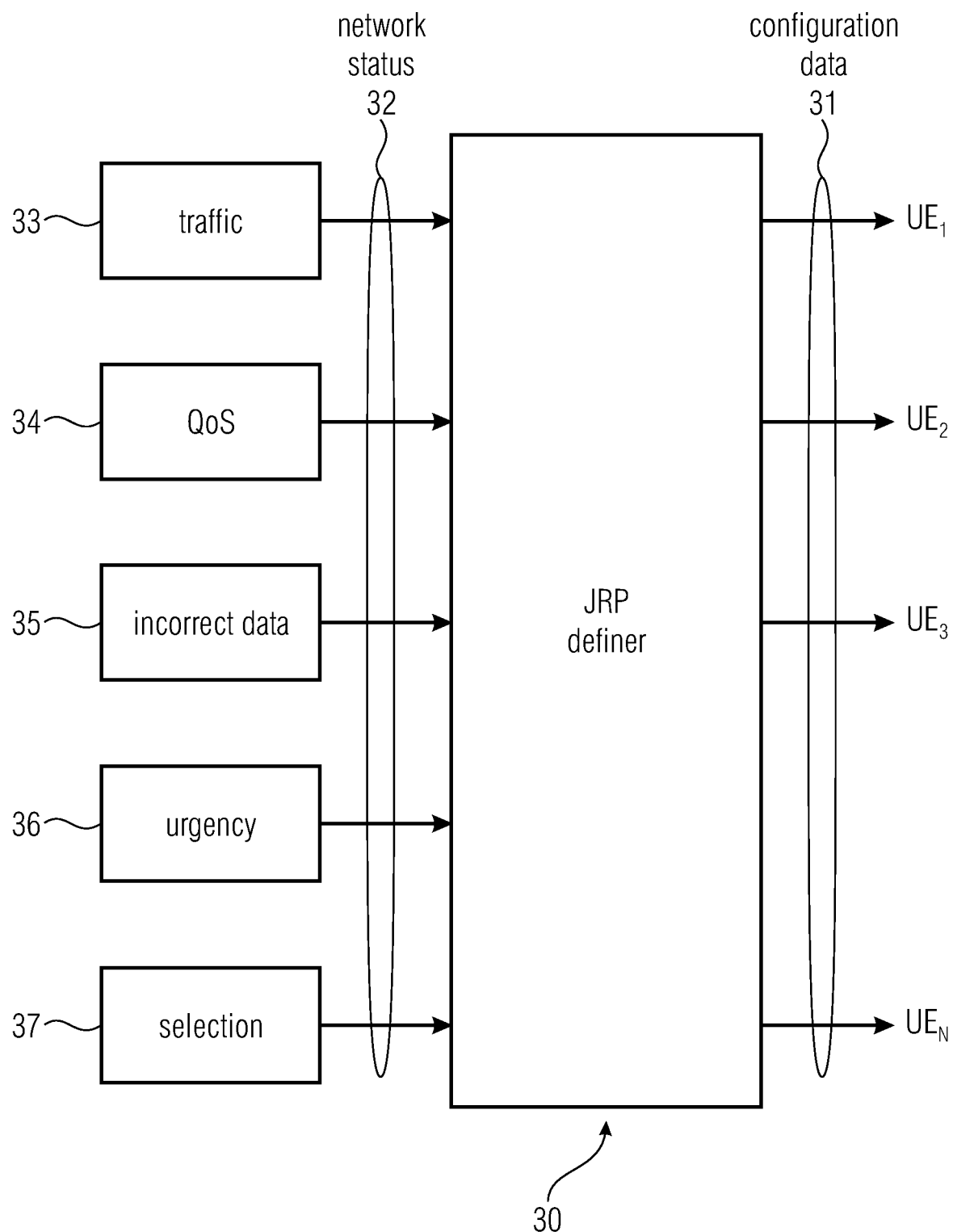
FIG. 3 shows a device according to an example of the invention.

FIG. 3 shows a JRP definer 30 which may be (or may be a part of) the central entity and/or BS 22 or a UE elected or selected among the UEs. The JRP definer 30 may transmit (e.g., in step 14) configuration data 31 regarding JRP resources to different UEs ($UE_1$, $UE_2$, $UE_3$, ..., $UE_N$, some of which may be the UEs 24-26, at least one of them, in some examples, performing an instance of method 15). The JRP definer 30 may decide the configuration data 31 (e.g., which physical resources to be used by which UE, and/or which rules for medium access and/or collision resolution to be used by which UE, and so on) on the basis of one or more criteria. Criteria may involve one or more data 33-37. In some examples, at least some of the data 32-37 may contribute to constitute a network status 32. Criteria may be pre-defined and/or defined and/or modified in real time.

The JRP definer 30 may define the configuration data on the basis of criteria at least in part involving the traffic 33 (or a metrics or an estimation associated thereto) in the network. The traffic may be measured, for example, by keeping in account the number of UEs present within the central device (which may be a BS, such as a g/eNB), the number of current calls, of sessions currently open, and so on. In some examples, if the traffic is not excessive, the quantity of JRP physical resources may be increased. In some examples, if the traffic is not excessive, the number of UEs competing to one JRP physical resources may be increased. In some examples, it may be provided that, at the determination of increase of the number of UE (e.g., within a cell), the quantity of JRP physical resources at disposal of at least some UEs may be decreased.

The JRP definer 30 may define the configuration data on the basis of criteria at least in part involving the quality of service (QoS) 34 (or a metrics or an estimation associated thereto) in the network. The QoS 34 may be measured, for example, by keeping into account statistics of non-properly decoded messages (e.g., UL communications from the UEs to the BS). In some examples, if the QoS is scarce for some particular UEs, the JRP may be modified by associating physical resources uniquely or preferentially to UEs which suffer from a low QoS. In some examples, if the QoS is in general scarce, the quantity of JRP physical resources may be increased.

The JRP definer 30 may define the configuration data on the basis of criteria at least in part involving the determination of incorrect data 36. If a UL data is not properly received by the central entity and/or BS (JRP definer), the latter may request a retransmission of some data.

Estimations may comprise statistical data (e.g., associated to the geographical location, the human presence, and so on). Estimations may be, at least in part, conditioned by historical data and/or calculated automatically and/or at least partially based on empirical knowledge.

The JRP definer 30 may define the configuration data 31 on the basis of criteria at least in part involving the urgency 36 of communications (call communications, special sessions, etc.), e.g., for safety-related purposes (first responder, and so on). Examples may be ultra-reliable low-latency communications (URLLC). The UEs needing urgent communications may be assigned to use additional JRP resources by the JRP definer 30. To the contrary, JRP resources may be reduced for UEs which do not need urgent communications.

The JRP definer 30 may determine the configuration data 31 on the basis of criteria at least in part involving a selection 37. Selected UEs may be assigned to additional JRP physical resources. Non-selected UEs may be given a decreased (or null in some examples) quantity of JRP physical resources. A selection may be operated, for example, by a user's request (e.g., as an additional service provided by the service provider managing the network). Accordingly, increased communication capabilities and/or reliability and/or speed may be offered to selected users.

Notably, the JRP definer may operate in real time, e.g., by changing the criteria on the basis of the different network status.

An example may be related to a sport event: it may be foreseen that several users in the public will request additional communication capabilities (premium service) prevalently associated to the time and location of the sport event.

Some hours before and some hours after the event, the interest of the users for the premium service in that location will be extremely reduced. Accordingly, in the location of the sport event, different times of the day may be associated to different criteria (and different configuration data, and different allocation of physical resources and rules to different UEs).

The criteria for assigning JRP resources to different UEs may evolve in real time on the basis of the status of the network (situation of the UEs).

In some examples, a pre-condition for assigning physical JRP resources (or in any case modifying the configuration data) is the reception, by the JRP definer (central device, e.g., the BS or a UE chosen among the UEs) of an explicit request from a UE. On the basis of the status of the network, the JRP definer (central device, e.g., the BS) may decide to satisfy/refuse the request.

Figure 4:
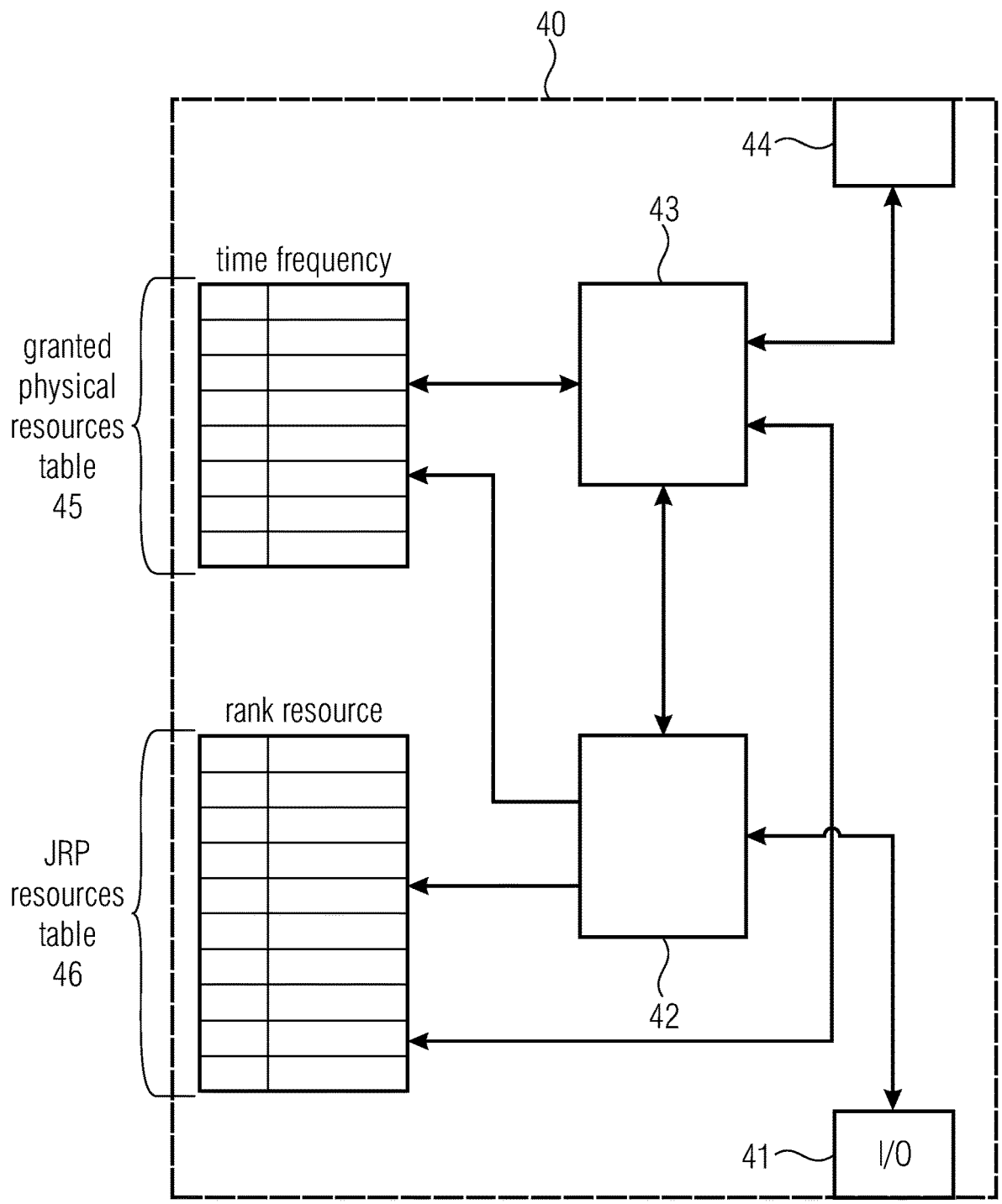
FIG. 4 shows a device according to an example of the invention.

FIG. 4 shows a device 40 which may be a UE or an electronic circuitry governing a UE (e.g., 24-28, $UE_1$-$UE_N$, and/or a UE which implements the method 15), for example a mobile phone. A processor 42 may be used. The processor 42 may comprise a logic semiconductor device such as a digital signal processor, DSP, a microcontroller, a field programmable gate array, FPGA, and so on). In processor 42, an application (e.g., high-layer application) may be executed. For example, the application may request the transmission of voice on a mobile phone network. In some examples, the processor 42 may support a data transmission (e.g., VoIP or Video data) and/or voice transmission.

The device 40 may comprise an input/output (I/O) unit 41. In some examples, the I/O unit 41 may obtain audio signals (or an analogic or digital electronic version thereof) which are transmitted to a processor 42. The I/O unit 41 may additionally or alternatively be connected with remote devices (e.g., for hotspot use).

The device may also comprise non-transitory storage memory unit which may be executed by the processor 42 to implement the functions of the UE and/or at least some steps 16-18 and or the application discussed above.

UL transmissions may be performed by using an antenna 44 which is controlled by a communication unit 43. The latter, in turn, may be controlled by the processor 42. In examples, the I/O unit 41 (or a wireless sub-unit of the I/O unit 41) may be integrated in the same component of the antenna 44 and/or the communication unit 43.

The communication unit 43 may operate at the medium access control (MAC) layer and/or at the physical (PHY) layer. The communication unit 43 may transmit data in UL (e.g., toward a BS) and receive data in DL (e.g., from a BS).

The communication unit 43 may perform UL transmissions on granted physical resources on the basis of a granted physical resources table 45. The table 45 may be embodied, for example, by memory elements (random access memory, RAM, registers, FLASH memory, and so on). In some examples, the table 45 may be modified by the processor 42 (in some examples, the table 45 may be modified by the communication unit 43 and/or by both the processor and the communication unit). For example, the processor 42 may be instructed by a BS (or a selected UE) to choose a particular scheduling.

The table 45 may guide the communication unit 43 to correctly transmit the UL data. In the representation of FIG. 4, each row of the table 45 may be associated to a particular granted physical resource. Columns of the table 45 may be associated to domains (e.g., time domain, frequency domain, spatial domain, code domain, power domain), even if in FIG. 4 only time domain and frequency domain are shown for simplicity. Therefore, each time UL data are to be transmitted, the communication unit 43 knows, for example, at which time slot and/or at which frequency band (and/or spatial channel, and/or code, and/or power level) the UL communication is to be performed.

The communication unit 43 may perform UL transmissions on JRP physical resources on the basis of a JRP physical resources table 46. The table 46 may be embodied, for example, by memory elements (RAM, registers, FLASH memory, and so on). In some examples, the table 46 may be created and/or controlled and/or modified by the processor 42 (in some examples, the table 46 may be modified by the communication unit 43 and/or by both the processor and the communication unit). For example, the processor 42 may receive configuration data (e.g., 31) obtained at step 16. Therefore, the table 46 may guide the communication unit 43 to correctly transmit UL data using JRP. In the representation of FIG. 4, each row of the table 46 may be associated to a particular data to be transmitted. Each column of the table 46 may be associated to the resource (in the time domain, frequency domain, spatial domain, code domain, and/or power domain). Each time UL data may be to be transmitted in association to the JRP, the communication unit 43 knows, for example, at which time slot, at which frequency band, in which spatial channel, with codes, and/or at which power level the UL communication is to be performed.

In some examples, the positions in the table 46 are ranked. The first row in the table 46 may be associated to a first-ranked JRP resource; the second row may be associated to a second-ranked JRP resource; and so on. Accordingly, the JRP resources may be prioritized (e.g., subjected to a priority scheme). The first-ranked JRP resource may be chosen with preference (or in some examples with higher probability, e.g., in case or use of random, semi-random, pseudo-random strategies) with respect to the second-ranked JRP resource, and so on. For example, the processor 42 may allocate a data to be transmitted in the highest-ranked row of table 46. The communication unit 43 will perform a UL transmission of that data using the highest-ranked JRP resource associated. If the processor 42 accumulates a plurality of data in the table 46 before evacuating them (e.g., in case of high payload or urgent communications, e.g., PUCCH), some data to be transmitted will take lower-ranked positions (associated to lower-ranked JRP resources). Notwithstanding, the communication unit 43 will transmit the data in correspondence with the JRP resources in the table 46.

In some cases, frequency hopping schemes may be used. Subsequent UL transmissions may be performed at different frequency bands.

In examples, the ranking of the JRP resources may be assigned by the central entity (BS (e.g., BS, such as gNB/eNB or core network entity, or elected or selected UE) on and signalled to the UE as part of the configuration data 31 (e.g., 24', 26', 28', 31, and/or at step 14). Notably, the central entity and/or BS (e.g., 22, 30, and/or at step 13) may associate different rankings (or probabilities in case of random, semi-random, pseudo-random strategies) to different UEs. For example, if a first UE is commanded to use a particular ranking and a second UE is commanded to use the opposite ranking (in the sense that the first-ranked JRP resource of the first UE is the last-ranked JRP resource of the second UE and vice versa), collisions between their UL transmissions will only rarely occur: while the first UE will preferentially transmit in its higher-ranked JRP resources, the second UE will preferentially transmit in the JRP resources which, under the first UE's point of view, are lower-ranked resources, hence reducing collision probability. In examples, the UE may use a ranking of JRP resources ($52a$-$52k$) so as to give priority to particular-ranked JRP resources providing gains for targeted goal.

Basically, the tables 45 and 46 may be understood as forming a transmission queue of UL data to be transmitted. The processor 42 may allocate some data to be transmitted in the table 45 (granted resource portion of the queue) and some other data to be transmitted in the table 46 (JRP resource portion of the queue).

Figure 5A:
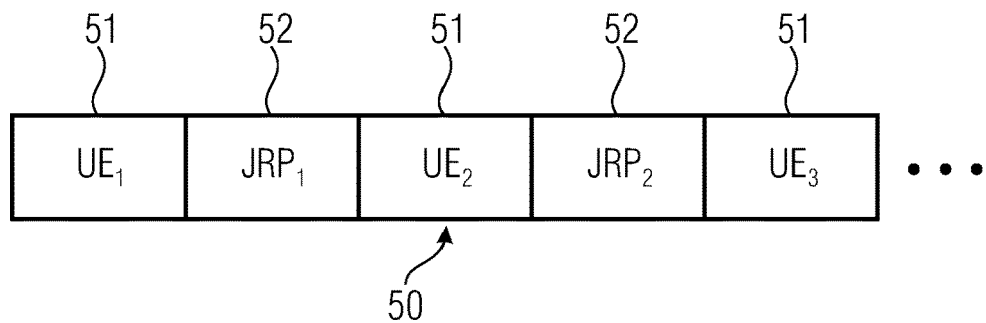
FIGS. 5a-5c, 6a-6c, and 7-10 show techniques according to examples of the invention.

FIG. 5a shows an example of repartition of JRP physical resources 52 ($JRP_1$, $JRP_2$) and granted physical resources 51 (associated to UEs $UE_1$, $UE_2$, $UE_3$) according to examples. The configuration data 31 may provide, for example, that $JRP_1$ is shared by $UE_1$ and $UE_2$, while $JRP_2$ is shared by $UE_2$ and $UE_3$. $JRP_1$ and $JRP_2$ may be any collection (region) of JRP physical resources in the time domain, frequency domain, spatial domain, code domain, and/or power domain. $UE_2$ may choose between $JRP_1$ and $JRP_2$, for example.

Figure 5B:
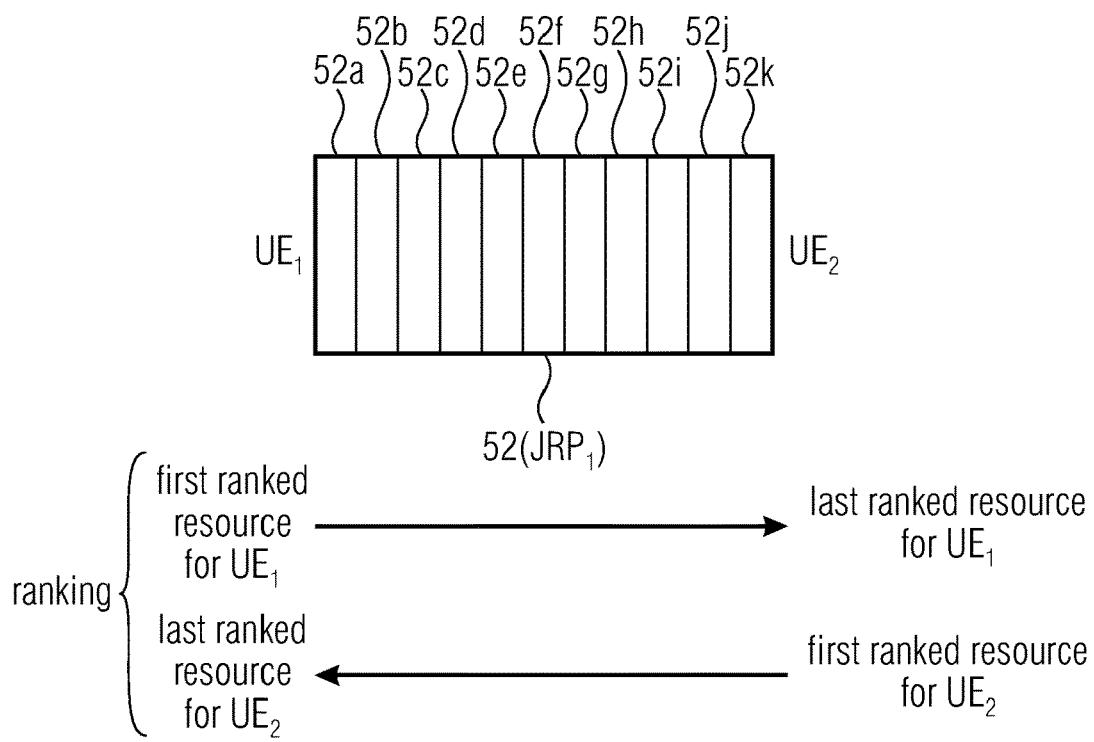

FIG. 5b shows $JRP_1$ as constituted by a plurality of JRP physical resources $52a$-$52h$. In some examples, the JRP physical resources $52a$-$52h$ may be ranked (e.g., as defined by the configuration data). $UE_1$ may have a ranking list (e.g., as in table 46) according to which the JRP physical resource $52a$ is the first-ranked resource, the JRP physical resource $52b$ is the second-ranked resource, and the JRP physical resource $52k$ is the last-ranked resource. $UE_2$ may have a ranking list (e.g., as in table 46) according to which the JRP physical resource $52k$ is the first-ranked resource, the JRP physical resource $52j$ is the second-ranked resource, and the JRP physical resource $52a$ is the last-ranked resource. Accordingly, $UE_1$ may choose to preferentially transmit UL data using the JRP physical resource $52a$, while $UE_2$ may choose to preferentially transmit UL data using the JRP physical resource $52k$. In situations in which $UE_1$ only transmits in its higher-ranked half of $JRP_1$ (e.g., $51a$-$51e$) and in situations in which $UE_2$ only transmits its higher-ranked half of $JRP_2$ (e.g., $51k$-$51g$), no collisions occur.

Figure 5C:
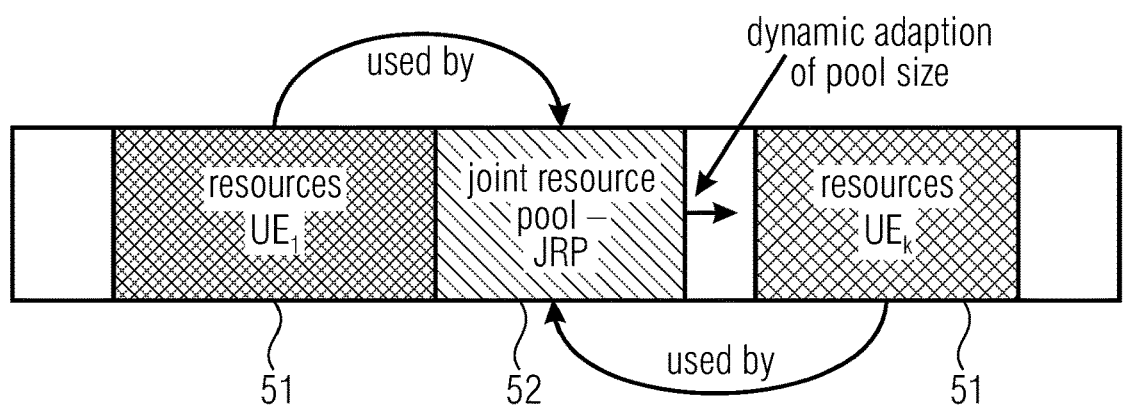

FIG. 5c shows dynamic adaption of pool size according to an example. In case $UE_i$ needs to transmit more UL data than possible with its granted physical resources 51, $UE_i$ may make use of JRP resources 52. If a ranking scheme (e.g., frequency hopping scheme) is used, the JRP dynamically adapts to the necessities of $UE_i$ (e.g., by choosing preferentially resource $52a$, then $52b$, then $52c$, and so on).

Figure 6A:
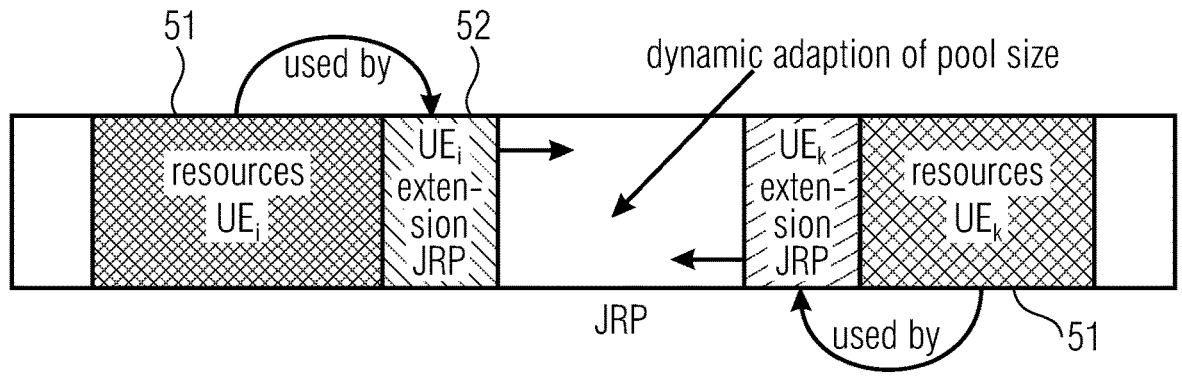
Figure 6B:
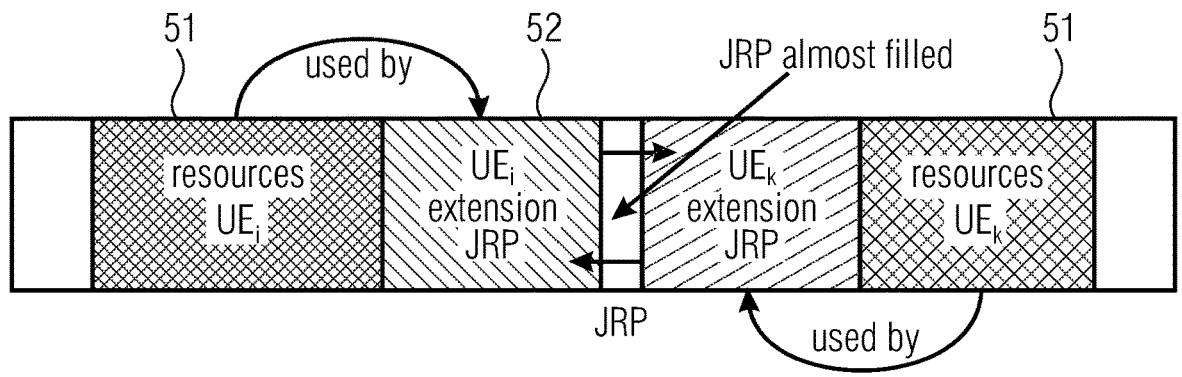
Figure 6C:
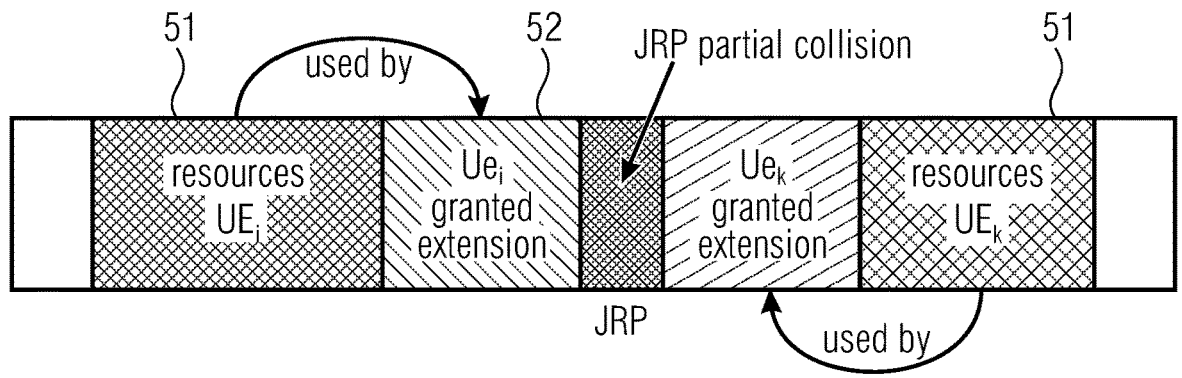

FIGS. 6a-6c show different cases of use of shared JRP resources. Case ~1 of FIG. 6a refers to the case of $UE_i$ and $UE_k$ using different JRP physical resources (e.g., according to different rankings). Case ~2 of FIG. 6b refers to the case of $UE_i$ and $UE_k$ increasing the use of JRP physical resources. Case ~3 of FIG. 6c refers to the case of $UE_i$ and $UE_k$ increasing the use of JRP physical resources to the point that some JRP physical resources used by $UE_i$ overlap with some used by $UE_k$ (with reference to FIG. 5b, both the UEs may use some of the resources $52c$-$52h$, for example). In the last case, collisions may occur.

In some examples, collisions may occur, for example, where two different UEs have the possibility of performing UL communications at the same time.

Configuration data may comprise rules that are to be followed by at least some of the UEs for the access medium and/or collision resolution when using JRP. In some examples, at least some (and, in some particular examples, all of) the rules may be pre-defined. In some examples, rules define how to multiplex data in different domains.

In some examples, according to rules contained in the configuration data and/or pre-definitions, a UE may either randomly, semi-randomly, pseudo-randomly, or based on a pre-defined allocation and/or frequency hopping scheme allocate resources in a JRP region. The resource access may be contention-based. The data retransmissions may be based on a random backoff timer to reduce the number of potential collisions.

In some examples, according to rules contained in the configuration data and/or pre-definitions, a UE may use JRP physical resources in the spatial domain, which may imply the use of diversity techniques and/or beamforming techniques. In some examples, according to some rules collisions may be solved by performing special beamforming techniques only on resources used in the JRP region.

In some examples, according to rules contained in the configuration data and/or pre-definitions, JRP can also be located in an industrial, scientific and medical band (ISM) band using LTE/NR unlicensed access procedures, e.g. such as licenced assisted access (LAA).

In some examples, according to rules contained in the configuration data and/or pre-definitions, Listen Before Talk (LBT) procedures may be used. LBT procedures may use WiFi and/or carrier sense multiple access with collision avoidance (CSMA/CA) MAC protocols, and/or low power channel hopping MAC protocols, which are used in other wireless low power technologies, e.g. such as Bluetooth.

Hopping schemes may be based on random, semi-random, pseudo-random base and/or on pre-defined parameters or configuration data (e.g., provided by the central entity). Therefore, pre-defined hopping patterns when performing JRP UL transmissions may also be obtained.

In some examples, according to rules contained in the configuration data and/or pre-definitions, in the code domain non-orthogonal multi-user transmission techniques (MUST), e.g. NOMA, may be used. UEs may transmit on the same physical resource and be distinguished by a receiver using special MUST decoders. According to some examples, collisions may be solved by using MUST transmission techniques in the JRP region.

In some examples, rules contained in the configuration data and/or pre-definitions may operate for URLLC.

In some examples, rules contained in the configuration data and/or pre-definitions may operate using an semi-persistent scheduling, SPS, technique.

In some examples, rules contained in the configuration data and/or pre-definitions may operate using an ARQ or HARQ technique. A special HARQ procedure for the JRP may be provided.

According to some rules, the UE refrains from requesting acknowledgments (ACKs) or non-acknowledgments (NACKs) from the central entity and/or BS (e.g., BS).

According to some rules, data may be retransmitted. According to some rules, when it is determined (either by the UE or by an external device, such as a central entity and/or BS) that a data is corrupted (e.g., by performing techniques such as cyclic redundancy check, CRC), a retransmission may be performed. According to some rules, if an external device (central entity and/or BS) determines that an UL data has been determined as being corrupted, the external device may inform the UE of the incorrect decoding (e.g., transmission of a NACK). According to some rules, an external device (central entity and/or BS) may transmit an ACK at the determination of proper decoding of an UL data: the UE may retransmit a data when it determines that no ACK has been obtained within a threshold. According to some rules, at least some UL data are routinely retransmitted.

Figure 7:
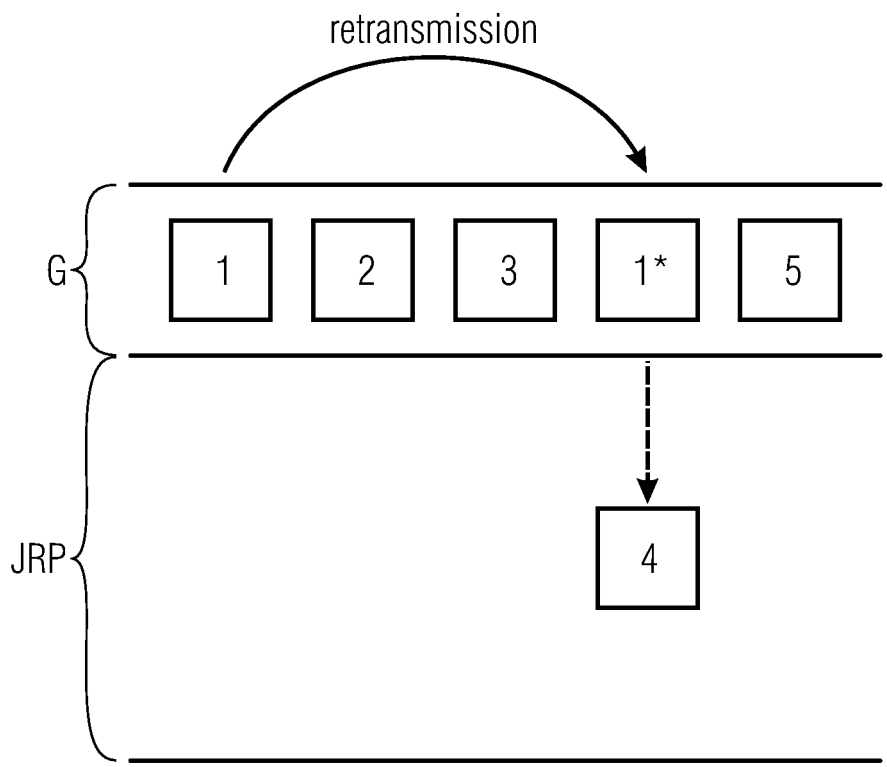
Figure 8:
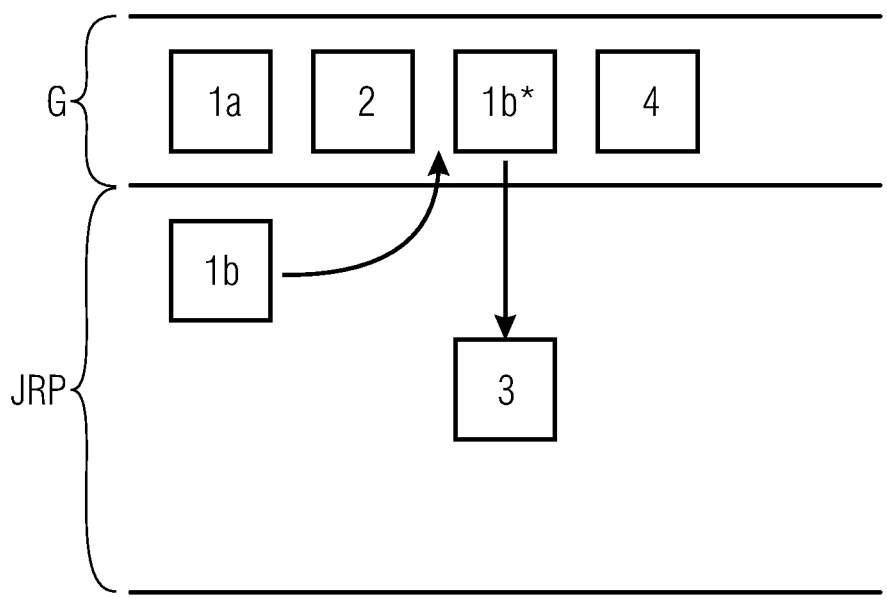

FIGS. 7 and 8 refer to rules for retransmitting data previously transmitted (either in JRP or in G) while shifting to JRP the data originally scheduled for G.

FIG. 7 shows an example of UL data retransmission according to a particular rule (pre-defined and/or contained in configuration data). G refers to the granted physical resources and JRP to the JRP physical resources. UL data #1 is scheduled to be transmitted before data #2, #3, #4, and #5, in sequence. Data #1 is retransmitted (either in view of a determination of non-proper decoding or as a routine, e.g., to increase redundancy) as data #1* in G. The transmission of data #1* in G may be in the same granted physical resource assigned to data #4, which may therefore be shifted to the JRP. In examples, the transmission of data #1* comprise redundancy data.

With reference to FIGS. 4 and 7, data #1, #2, #3, #4, and #5 were originally stored in different rows of the granted physical resource table 45. However, when the retransmission of data #1 is decided, data #4 is deleted from the granted physical resource table 45 and written in the JRP physical resource table 46, while data #1* is written in the granted physical resource table 45. This delete-rewrite technique may be performed by the processor 42, and/or by the communication controller 43, and/or by other hardware, according to examples and implementations.

FIG. 8 shows an example of UL data retransmission according to a rule (pre-defined and/or contained in configuration data). While data #1*a* is transmitted in the granted physical resource G, data #1*b* is transmitted in the JRP, e.g., using different physical resources (e.g., different frequency bands, different spatial channels, different power levels). A retransmission of data #1*b* is performed in G, in the same physical resource which is originally scheduled for data #3.

With reference to FIGS. 4 and 8, data #1*a*, #2, #3, and #4 were originally stored in different rows of the granted physical resource table 45, while data #1*b* were originally stored in the JRP physical resource table 46. However, when the retransmission of data #1*b* is decided, data #3 is deleted from the granted physical resource table 45 and written in the JRP physical resource table 46, while data #1*b* is written in the granted physical resource table 45.

These delete-rewrite techniques may be performed by the processor 42, and/or by the communication controller 43, and/or by other hardware, according to the examples and the implementations.

Figure 9:
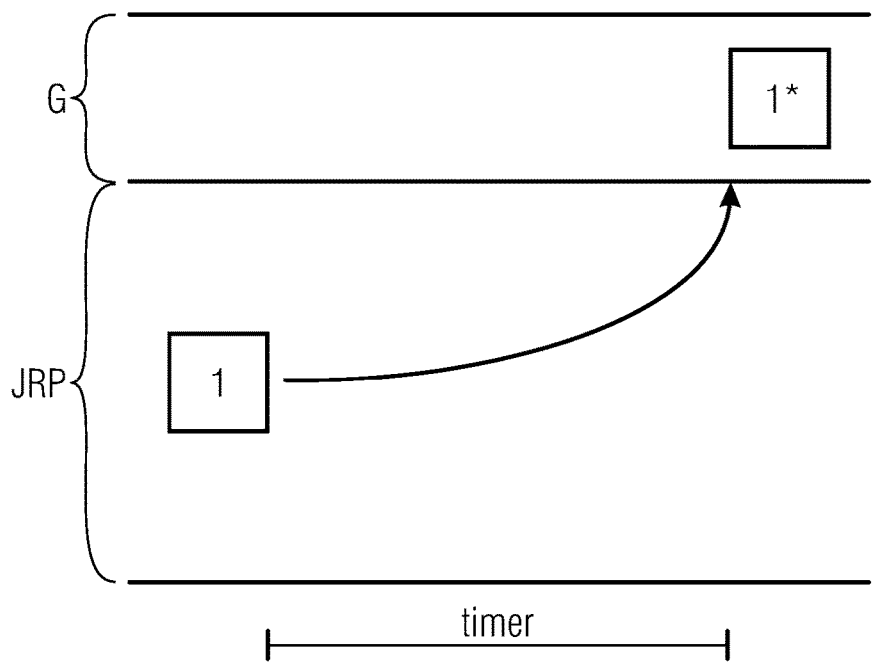

FIG. 9 shows a technique which follows a rule which may be used in addition or alternative to the rule of FIG. 8. Data #1 is transmitted in JRP but, after a backoff timer having expired, the data is retransmitted as data #1* in G.

Retransmissions with different resources may be advantageous, in that there is the possibility that some resources are (e.g., temporarily or unforeseeably) unavailable or unreliable. Therefore, a retransmission in G instead of in JRP may permit to increase diversity and reliability.

According to examples, and/or rules, data retransmissions above and/or below may be complete (e.g., by retransmitting a whole message) and/or partial (e.g., by retransmitting only a part of the data). According to examples, and/or rules, data retransmissions above and/or below may be such that only redundancy data are transmitted (e.g., for HARQ techniques).

Notably, there is not the necessity for the central device (e.g., BS) to reschedule the communications, hence increasing efficiency.

Figure 10:
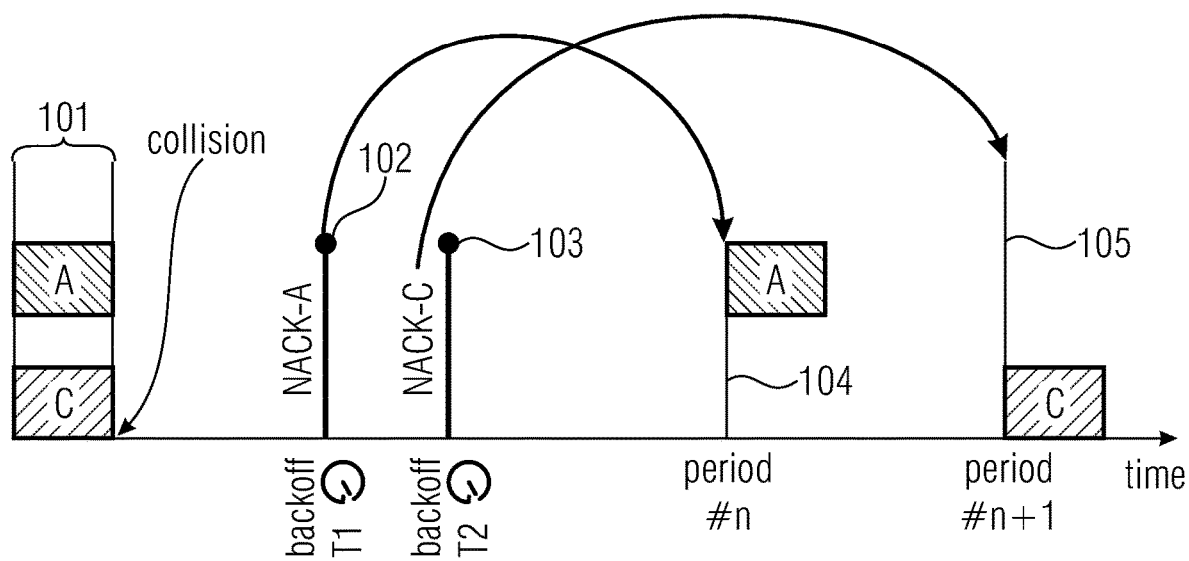
Figure 11:
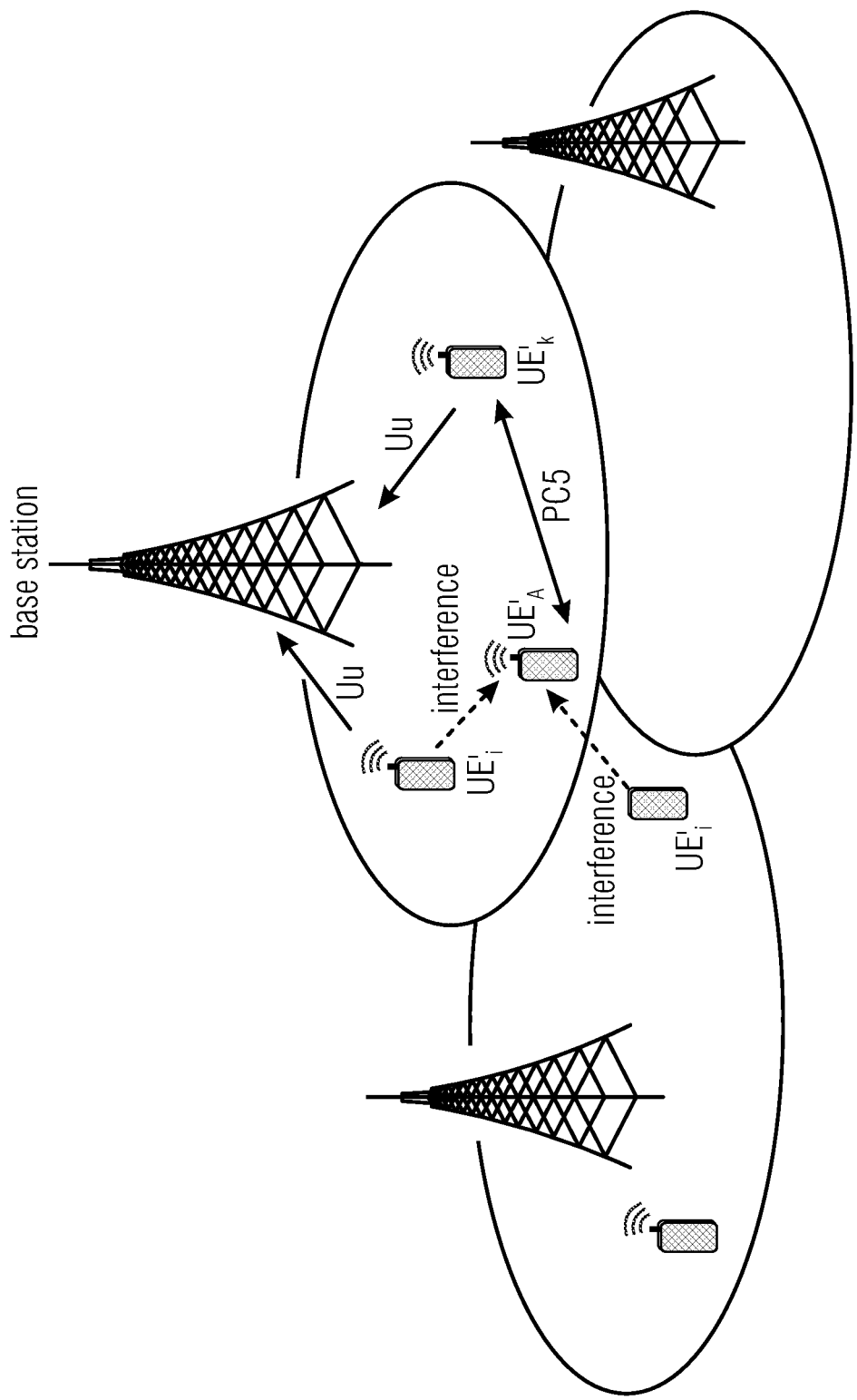
FIG. 11 shows a system according to the known technology.

Some rules (e.g., provided with the configuration data and/or pre-defined) may imply the use of backoff timers for different UEs, e.g., when implementing SPS techniques. An example is provided by FIG. 10. A collision between data transmitted by UEs A and C may occur, as a consequence of both UEs starting UL transmissions simultaneously in the same JRP resource block 101, to which both UEs have the right to access (e.g., according to the configuration data transmitted by the central entity and/or BS). Both the transmitted data are not properly decoded by the central entity and/or BS, which therefore transmits a NACK message directed to UE A (at 102) and a NACK message directed to UE C (at 103). The UEs may retransmit the data (at 104 and 105) after having waited different backoff timers (T1 and T2) to elapse. The backoff timers may be provided by the central entity and/or BS with the NACK message, may be pre-defined, may be determined randomly, semi-randomly, or pseudo-randomly by the UEs, and/or may be indicated in the configuration data transmitted by the central entity and/or BS.

Some rules may provide for a LBT technique (e.g., CSMA/CA, for example). Each UE may detect transmissions (e.g., by sampling) before starting a transmission on the JRP. A carrier sensing schema may be used. For example, a backoff timer may be used by a first UE which senses that a particular JRP resource is being accessed by another UE. While waiting for the backoff timer to elapse, the first UE may notwithstanding perform UL communications on other granted physical resources. Accordingly, the probability of superposing transmissions between different UEs is greatly reduced.

Some rules may provide that UL transmissions using JRP may be initiated only at the detection of some specific errors, or when particular QoS flows are determined.

Some rules may provide that UL transmissions using JRP may be initiated only when a particular disappointing error rate is detected (e.g., a block or maximum packet error rate or the rate of NACKs is experienced, or on the basis of statistics on HARQ).

Some rules may provide at least some of the following schemes:
Configure to switch on/off HARQ process for JRP resources;
Configure backoff timer, when using carrier sensing during random access of JRP resources;
Configure UEs to exchange information (e.g., via D2D and/or PC5) to align configuration of JRP access, e.g. they choose orthogonal hopping sequences if within reach of one another;
Define sensing measurements on the resource pools (e.g. UEs randomly monitor usage of JRP resources, or the BS monitors JRP resources and signals this to the UEs via unicast/multicast/broadcast. Based upon this utilization ratios, the device can choose to utilize JRP resources).

Some rules may provide to choose a licensed frequency band, for example:
In-band (within the same component carrier);
Out-of-band (e.g. guard-band);
Carrier aggregation (e.g. in a separate band);
The JRP can be within an ISM band (special access of aggregated ISM resources) or any other type of unlicensed band.

Data that may be transmitted via JRP may be:
In some examples, data resources only (e.g., Physical Uplink Shared Channel, PUSCH);

In some examples, control resource only, e.g., measurements reports;

In some examples, both data resources and control resource.

A discussion on the present invention is here provided. It is here referred to a communication scenario, especially for URLLC services, e.g., where UEs compete for resource grants in the UL. Furthermore, examples above may be used when a UE (or a group of UEs) experiences UL transmission peaks caused by data packets received from a higher layer, e.g. application layer, or a high number of occurring retransmissions on the physical layer. Examples of this idea can be applied, for example, if the transmission peaks occur on an irregular time basis, and thus cannot be handled by the standard dynamic or semi-persistent (SPS) RRM in the given time interval demanded by the service.

An important idea is that in case of instant transmission peaks (high traffic demands), the UE, in addition to potentially assigned dedicated (or grant-based) physical resources, transmits the exceeding data on resources using the joint-resource pool (JRP). In examples, the JRP may be reserved for multi-user grant-free access. This resource pool may comprise a dynamic percentage of radio resources provided by the particular base station, e.g., in time, frequency, spatial and/or code domain. When several UEs access the same JRP resource simultaneously, a partial collision on the JRP resource may occur.

A single UE or a set of UEs can transport all data packets in a service queue within a very short time period, although the particular UE might not have resource grants for all data packets in a particular time instance. This is especially the case of low latency traffic (as in URLLC scenarios).

Since the JRP is intended to be used on a grant-free basis, it can occur that multiple UEs in need of JRP-resources transmit on the same physical resource. Methods to resolve collisions faster may therefore be provided. Some methods may only work on the JRP region, or may take simultaneously into account both the JRP and the dedicated data region (granted physical resources). A refinement of particular use cases when accessing the JRP is depicted in FIGS. 5c and 6a-6c.

Partial collision can also occur when UEs in neighboring cells access the JRP. Thus, interference caused by surrounding UEs or base stations will influence collision resolution on JRP resources.

Thus, there may be defined rules (e.g., signalled in the configuration data 31 from the central entity to the UEs) for handling:

Access procedure of JRP resources (contention-based as well as contention-free-based);

Partial collision and collision resolution on JRP resources including HARQ protocols including partial decoding and partial retransmission of code words, Joint use of dedicated and JRP resources including HARQ protocols;

Coding using MUST concepts on JRP resources;

Collision detection including signaling of the utilization ratio of JRP resources from a particular UE to another entity (UE via PC5, BS via Uu).

The following items may be relevant for signaling between the central entity (e.g., BS) and UEs with reference to the joint resource pool (JRP), and may be involved in the information exchanged in the configuration data 31:

Location of JRP in time and/or frequency and/or space and/or code and/or power level;

Maximum usage of JRP per UE (e.g. number of physical resources, such as either granted resources and/or JRP resources);

Multiplexing parameter (hopping sequence, code (e.g. CDMA) or non-orthogonal multiple access (NOMA) schemes, such as MUST sequence/pattern, time slots).

Feedback mode, e.g., ACK/NACK, ACK only (with timer), dedicated signaling of pool usage (in granted resources);

Collision backoff (QoS) and/or collision resolution using explicit signaling to mute a user and such prevent this user to access JRP resource for a certain time period. Possible signaling to reactivate a user so that this user can use JRP resources again;

JRP utilization ratio per UE: if there is no overlap (collision), detection may be easily without signaling. Otherwise, the JRP utilization ratio per UE may be signalled to the central entity (e.g., BS, such as an eNB) or via D2D (e.g., PC5) to neighboring UEs.

The signaling performed at 14 may either be in the dedicated resources, the shared resources JRP (e.g. region least likely to be affected by collisions) or a separate control signaling channel. In some examples, JRP collision backoff procedures for a particular UE or group of UEs may be provided. In examples, UEs could be ranked by QoS demands. Using this, UEs could be prioritized using QoS classes. There is the possibility of defining a mute signal: the central entity or BS (e.g., eNB/gNB, core network entity) could transmit a mute signal indicating to a particular UE via unicast, or a group of UEs via multicast/broadcast to stop using JRP resources.

Reference is here provided to particular functions and schemes that may be involved in examples discussed above.

Numerology in the 5G and new radio (NR) communication defines multiple subcarrier spacing (SCS), e.g., 15, 30, 60, 120, . . . This means that the SCS in general is defined to be $2^k*15$ kHz, where k=0,1,2, . . . The 15 kHz SCS was the only spacing defined for LTE (4G).

Pilot power is the transmit power of the reference signals (RS) that are used for, e.g., channel estimation and channel quality indications.

The bandwidth part (BWP) is defined in NR where every UE can support one or more BWP of the transmission band and the BWP may have one or more numerologies as defined above.

RADIO RESOURCE MANAGEMENT—In general, UEs associated to a BS may compete for a limited set of resources. These resources may be assigned in the downlink (DL) as well as on the uplink (UL) to a set of UEs chosen by the central entity or BS. The central entity or BS (e.g., 22, 22b) performing this resource assignment may be the scheduler or the radio resource management (RRM). The DL and/or UL resource assignment or resource map may be both indicated or broadcasted to all UEs in the DL control channel (PDCCH) using the downlink control indication (DCI) or using special fields in the DL shared data channel (PDSCH), depending on the particular operation mode, which might differ in LTE and NR standards. Note that NR will use a self-contained frame structure, where data and signaling traffic is packed more densely for the particular UE receiving data. In the case of dynamic scheduling, the RRM can assign resources or uplink resource grants in every LTE or NR subframe or scheduling entity. A resource may be different frequency resources assigned within a certain time period, e.g. comprising of frequency resources over a number of OFDM symbols (OS), a group of frequency resource or physical resource blocks (PRBs), PRBs assigned over different carriers (carrier aggregation), different physical links (as is dual connectivity), different resource pools or direct communication between two UEs or devices (D2D), PRBs assigned over different radio access technologies (Multi-RAT), resources assigned on different spatial degrees-of-freedom (e.g. transmit antennas using beamforming) using advanced beamforming techniques.

SEMI-PERSISTENT SCHEDULING (SPS)—SPS [1] is a possibility to reduce control signal traffic for resource grants. It may operate in DL and/or UL direction. SPS may reduce control traffic for resources scheduled on a regular time grid, e.g. data packets assigned every 80 ms or 120 ms, e.g., in voice-over-IP (VoIP) services. Especially if constant packet sizes are used (e.g., depending on the VoIP codec), SPS and VoIP (e.g., with constant bit rates and constant intervals) may minimize resources used for control signaling. SPS may be configured during setup of the radio (QoS) bearer. The SPS configuration may contain information on the RRM cycles, and may basically be a configuration template that can be activated, released or altered while being applied. In general, SPS in LTE is configured separately in
    downlink (semiPersistSchedIntervalDL) and
    uplink (semiPersistSchedIntervalUL) direction.

An SPS configuration is listed in TR 36.331, "Radio Resource Control (RRC); Protocol specification", an example is given below. Here, sf10 corresponds to 10 subframes, sf128 corresponds to 120 subframes.
    semiPersistSchedIntervalDL
    ENUMERATED {
        sf10, sf20, sf32, sf40, sf64, sf80, sf128, sf160, sf320, sf640, spare6, spare5, spare4, spare3, spare2, spare1},
    semiPersistSchedIntervalUL
    ENUMERATED {
        sf10, sf20, sf32, sf40, sf64, sf80, sf128, sf160, sf320, sf640, sf1-v14xy, sf2-v14xy, sf3-v14xy, sf4-v14xy, sf5-v14xy, spare1}

In 4G and 5G systems supporting short transmission time interval (sTTI) or URLLC services, the SPS interval can be further reduced to a value between 1-5 ms. Details can be found in TR 36.331.

HARQ MECHANISM—Hybrid automatic repeat request (HARQ) is a combination of a high-rate forward error correction code combined with repetition coding. It may be used to improve robustness of data transmission by selective retransmission of redundancy information of a data packet and by intelligently combining different versions of a data packet at a receiver. HARQ may be combined with transmission acknowledgement messages (ACKs) on successful reception of a data packet, not-acknowledgements (NACKs), when a data packet is received with errors, and/or timers, to reduce the control traffic used for ACK signaling. Furthermore, the NACK traffic may, in examples, indicate which redundancy version to repeat on the next transmission.

ULTRA RELIABLE LOW LATENCY COMMUNICATIONS (URLLC)—In addition to enhanced mobile broadband (eMBB) data traffic, URLLC is an important use case supported by LTE releases (see, for example, LTE Rel. 15) and NR technology. URLLC targets resource transmission end-to-end at 1 ms or below, e.g. 0.5 ms or 0.25 ms in NR, while supporting low packet error rates (PERs), e.g. $10^{-5}$ PERs. URLLC use cases are scenarios with small packet sizes of a few hundred Bytes, e.g. 200 Bytes, used for machine-type communication (MTC) scenarios. Note, in current LTE releases, end-to-end delays are typically limited by HARQ processing timers (at least 4 ms delay until the ACK/NACK is received), as well as by processing capabilities of current UE chipsets. To support URLLC, combining new chip technologies with advanced RRM becomes mandatory. Furthermore, LTE Rel. 15 introduces a shortened frame structure (sTTI), while NR defines larger subcarrier scaling (SCS) and mini-slots (the corresponding NR technology to sTTI in LTE). Note that mechanisms in LTE are limited due to backwards compatible to earlier releases. Nevertheless, examples may target both LTE and NR technology.

UPLINK GRANT-FREE ACCESS—this is a UL transmission scheme without uplink transmission grants designed for URLLC traffic. Resources may or may not be shared among one or more users. The resource configuration is not yet defined. This mode is especially interesting for URLLC traffic, since the UE does not need to wait for an UL resource grant or the UL SPS resource grant if the SPS interval is larger than the URLLC service requirement, e.g. SPS interval may be set to 120 ms, and the data shall be transmitted within 1 ms.

DEVICE-TO-DEVICE (D2D) COMMUNICATION— According to this scheme, the UE is communicating to another UE directly utilizing the dedicated UL resources. D2D defines proximity services (ProSe) where devices (UEs) in close proximity to detect one another can have this direct communication with each other, known as PC5. The main advantage of D2D is to decrease the network load, increase capacity in a given bandwidth, provide communication in off-network areas, e.g. the latter is especially important in case of special services such as use in public safety (PS) scenarios. If D2D communication takes place under the network coverage, the base station allocates dedicated frequency blocks in the UL to be used as the resource pools of the direct D2D PC5 communication. The resources are shared in a centralized or distributed manner. For the centralized method, the central entity (e.g., BS, e.g., eNB/gNB, core network entity) may allocate dedicated resource to the UE. In contrast, in distributed mode, also known as autonomous mode, the UE either randomly or after sensing allocates free resources on the PC5 resource pool to transmit data. In vehicular communications, a vehicle-to-vehicle (V2V) network will rely on SPS granting in each of the resource allocation modes [RP-161788, R2-162296].

Figure 12:
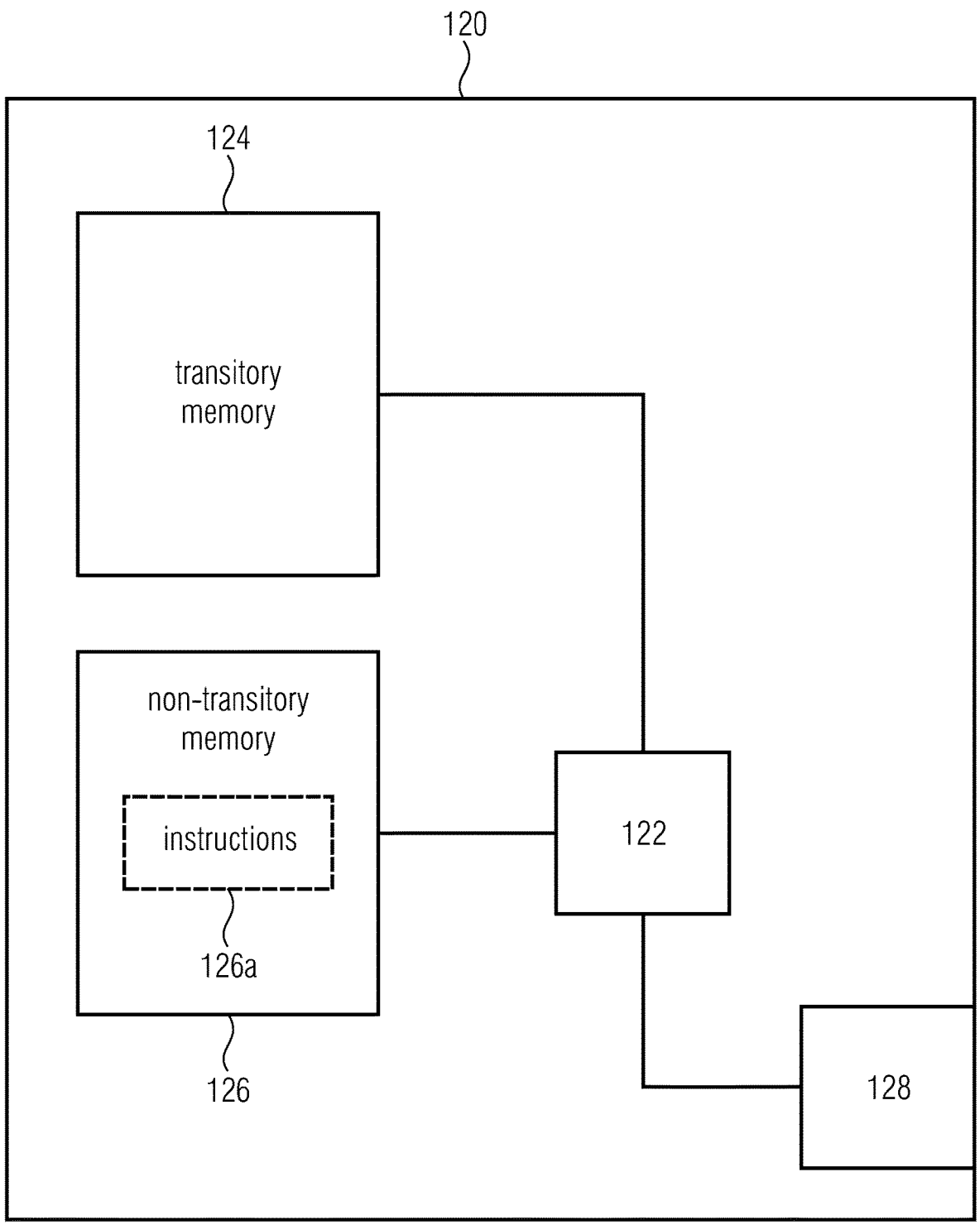
FIG. 12 shows a device according to an example of the invention.

FIG. 12 shows a system 120 comprising a processor 122 (which in some examples may be the processor 42) which may carry out at least one of the methods, steps, and/or operations discussed above and/or implement at least one of the devices, systems and/or products discussed above. The system 120 may comprise transitory memory 124 (random access memory, RAM and/or registers). For example, the tables 45 and 46 may be part of the transitory memory 124, in some examples.

Further, the system 120 may comprise a non-transitory memory unit 126 (e.g., implemented in a read-only memory, ROM, a flash, a firmware, etc.) comprising instructions 126a which, when executed by a processor (e.g., processor 122 and/or 42), may cause the processor to perform at least one of the methods and/or operations described above and/or to implement the functions of the devices, products and systems described above.

The system 120 may also comprise at least input/output, I/O, unit 128, for communicating to other devices.

Reliability is for delivering packets (data). Information from a sender to a recipient may have an error or outage probability below a given/selected/predefined level with in a given/selected/predefined time interval e.g. deliver a message A within 100 ms at an outage probability below $10^{-3}$.

In examples, the UE may be configured to achieve the used latency with the maximum allowed probability of failure and/or the maximum reliability/durability of data communication.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier.

In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

Equal or equivalent elements or elements with equal or equivalent functionality are denoted in the following description by equal or equivalent reference numerals even if occurring in different figures.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] SPS—http://howltestuffworks.blogspot.de/2013/10/semi-persistent-scheduling.html
[2] R1-1700024. "Support of URLLC in UL", Huawei, HiSilicon, Spokane, USA, January 2017
[3] R1-1700375. "Uplink URLLC Transmission without Grant", Intel, Spokane, USA, January 2017
[4] R1-1704481. "Discussions on HARQ for grant-free UL URLLC". Fujitsu, Spokane, USA, April 2017.

The invention claimed is:

1. A device, comprising:
at least one antenna; and
a communication circuit, wherein the communication circuit is configured for wireless communication via the antenna,
wherein the device is configured to:
receive configuration data of a joint-resource pool for uplink and communications of uplink data, wherein the uplink data is in physical resources of the joint-resource pool, wherein the physical resources of the joint-resource pool are shared with other devices;
transmit the uplink data in the joint-resource pool and, in case retransmission of a first portion of the uplink data is necessary, use a particular granted resource for retransmitting the first portion of the uplink data, and
access the joint-resource pool according to a listen-before-talk scheme.

2. The device of claim 1, wherein the listen-before-talk scheme is a carrier sense multiple access with collision avoidance scheme.

3. The device of claim 1, wherein the listen-before-talk scheme comprises uses a WiFi listen-before-talk scheme.

4. The device of claim 1, wherein the retransmission is initiated when the device determines that no acknowledgment has been received within a threshold.

5. The device of claim 1, further configured to:
use a particular granted resource for retransmitting the first portion of the uplink data; and
use the joint-resource pool for transmitting a second portion of the uplink data,
wherein the second portion of the uplink data is scheduled for the particular granted resource.

6. The device of claim 1, further configured to use a ranking of joint-resource pool resources so as to give priority to higher-ranked joint-resource pool resources.

7. The device of claim 6, further configured to:
transmit with preference using the first-ranked or last-ranked joint-resource pool resources.

8. The device of claim 6, further configured to:
transmit using the first-ranked joint-resource pool resources, according to a random, semi-random or pseudo-random scheme, with higher probability or lower probability, depending on a goal.

9. The device of claim 1, further configured to:
use a joint-resource pool table such that each row of the joint-resource pool table corresponds to at least one joint-resource pool resource;
allocate a third portion of the uplink data to be transmitted in the joint-resource pool table;
evacuate the joint-resource pool table according to the ranking.

10. The device of claim 1, wherein the device is configured:
to use a transmission queue implemented at a medium access control layer and/or a physical layer, and to evacuate the transmission queue using the joint-resource pool and/or the granted resources according to the configuration data.

11. The device of claim 10, wherein rows of the transmission queue are associated to the rankings of the joint-resource pool resources to be chosen for transmission.

12. The device of claim 1, further configured to:
access the joint-resource pool according to a frequency-hopping scheme.

13. The device of claim 1, further configured to:
participate with other devices to a setup for defining and/or electing a central entity, so that the central entity signals the configuration data of the joint-resource pool for uplink communications in the joint-resource pool physical resources shared with the other devices.

14. The device of claim 1, further configured to:
share joint-resource pool resources with another device, wherein the device employs a ranking list, wherein the ranking list is arranged such that higher-ranking joint-resource pool resources are inversely ordered with respect to lower-ranking joint-resource pool resources of a ranking list of the other device.

15. The device of claim 1, configured to transmit the uplink data after a backoff timer has expired.

16. The device of claim 15, wherein the backoff timer is provided to the device with a non-acknowledgement message.

17. The device of claim 15, wherein the device is configured to have a backoff timer different from the other devices.

18. The device of claim 1, wherein:
the joint-resource pool and the particular granted resource are Physical Uplink Shared Channel resources.

19. The device of claim 1, wherein information from a sender to a recipient comprises an error or outage probability below a level within a time interval.

20. The device of claim 1, wherein the device is configured such that, in case the device receives a mute signal, the device is prevented from accessing the joint-resource pool for a determined time.

21. The device of claim 20, wherein the device is configured, in case of reception of a reactivating signal, to restart to access to the joint-resource pool.

22. The device of claim 1, wherein the device is configured to stop transmitting using the resources of the joint-resource pool for a certain time period in response to signaling.

23. A method, comprising:
receiving, by a device, configuration data of a joint-resource pool for uplink communications of uplink data in physical resources of the joint-resource pool, wherein a joint-resource pool physical resource is shared by the device with at least one other device; and
transmitting, by the device, the uplink data in the joint-resource pool and, in case retransmission of a first portion of the uplink data is necessary, the device using a particular granted resource for retransmitting the first portion of the uplink data,
wherein the device accesses the joint-resource pool according to a listen-before-talk scheme.

24. A non-transitory digital storage medium having stored thereon machine readable instructions for performing a method when the machine readable instructions are executed by a processor, the method comprising:
receiving, by a device, configuration data of a joint-resource pool for uplink communications of uplink data in physical resources of the joint-resource pool, wherein a physical resource of the joint-resource pool is shared by the device with at least one other device; and
transmitting, by the device, the uplink data in the joint-resource pool and, in case retransmission of a first portion of the uplink data is necessary, the device using a particular granted resource for retransmitting the first portion of the uplink data,
wherein the device accesses the joint-resource pool performed according to a listen-before-talk scheme.

* * * * *